US012315309B2

(12) United States Patent
O'Grady

(10) Patent No.: US 12,315,309 B2
(45) Date of Patent: May 27, 2025

(54) REDUCING VEHICLE TELEMATIC LOAD WHILE PRESERVING THE ABILITY TO PERFORM HIGH-FIDELITY ANALYTICS

(71) Applicant: Rivian IP Holdings, LLC, Plymouth, MI (US)

(72) Inventor: Jack O'Grady, Venice, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 435 days.

(21) Appl. No.: 17/708,773

(22) Filed: Mar. 30, 2022

(65) Prior Publication Data

US 2023/0316816 A1 Oct. 5, 2023

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
None
See application file for complete search history.

(56) References Cited

U.S. PATENT DOCUMENTS

2002/0109581 A1* 8/2002 Blatz .................. G06K 19/0712 340/5.61
2016/0253849 A1* 9/2016 Kwak .................... G07C 5/008 701/31.5
2019/0383624 A1* 12/2019 Magzimof ........... H04B 17/373
2020/0035099 A1* 1/2020 Sivakumar ....... G08G 1/096827
2022/0076282 A1* 3/2022 Monassebian ........ G07F 17/246
2023/0171314 A1* 6/2023 Onti Srinivasan .. G06F 18/2431 370/474

* cited by examiner

*Primary Examiner* — Thu N Nguyen
(74) *Attorney, Agent, or Firm* — BAKERHOSTETLER

(57) ABSTRACT

Systems and methods for reducing a dataset or telematic load regarding vehicle information of a telematics system while also preserving the ability of a cloud-based server to perform analytics on the reduced dataset that would otherwise require full-fidelity data. A method, according to one implementation, includes the step of obtaining datasets from a plurality of sensors on a vehicle, where the datasets include vehicle-related metrics indicative of operations of the vehicle. The method further includes the step of extracting relevant data from the datasets to reduce a telematic load. Also, the method includes wirelessly transmitting the relevant data to a remote server using an external interface. The step of extracting the relevant data is configured to preserve the ability of the remote server to perform high-fidelity analytics on the relevant data.

21 Claims, 15 Drawing Sheets

REDUCING VEHICLE TELEMATIC LOAD WHILE PRESERVING THE ABILITY TO PERFORM HIGH-FIDELITY ANALYTICS

INTRODUCTION

The present disclosure generally relates to vehicle monitoring and telematic systems and methods. More particularly, the present disclosure relates to reducing the size of a telematic dataset while preserving the ability of a remote cloud-based server to perform high-fidelity analytics on the reduced dataset.

Generally, the field of "telematics" or "vehicle telematics" involves the use of vehicle-mounted sensors and instruments for detecting various characteristics of vehicles and wireless communication for transmitting these characteristics to other vehicles or to remote computer servers. The information can then be processed to determine various conditions and perform other actions in response to the different conditions. Thus, telematics encompasses the technology of sending, receiving, and storing information of one or more vehicles, the use of telecommunications and informatics for controlling vehicles on the road, global navigation systems using satellites and mobile communications technology, among others.

Also, telematics may refer to automation within vehicles, such as emergency warning systems, Global Positioning System (GPS) navigation, integrated hands-free cell phone systems, wireless safety communications, driving assistance systems, self-driving systems, etc. For example, such telematics systems may apply to wireless technologies and computation as defined in IEEE 802.11p, etc.

Furthermore, telematics is also used for the purpose of vehicle tracking, wherein the location, movement, route, status, and/or behavior of a vehicle can be monitored. In some cases, the status of a vehicle may be communicated to emergency services or dispatch services. Telematics may also be used for tracking trailers, freight containers, or other towed or mobile vehicles or equipment. In addition, fleet management may use telematics for the management of a fleet of vehicles, vans, trucks, ships, trains, etc.

The field of telematics may also encompass other operations, such as satellite navigation using GPS and/or other mapping tools to enable the driver of a vehicle to determine a current location, plan a route, navigate this route, re-route as needed based on various conditions, etc. In some cases, mobile communication is used to communicate radio waves, in real-time, to computers. These devices can be used while in the vehicle (e.g., Fixed Data Terminal devices) or for use in and out of the vehicle (e.g., Mobile Data Terminal devices).

Telematics may also involve wireless communications regarding vehicle safety, road safety, hazards, etc. Communication may include the exchange of safety information, locations and speeds of vehicles, locations of hazards, etc. This communication may operate over short range radio links and may involve temporary ad hoc wireless Local Area Networks (LANs). Wireless units may be installed in vehicles as well as at fixed locations along roads, such as near traffic signals and emergency call boxes. Mobile and fixed sensors may be configured to share information with a broad network to enable other vehicles to respond as needed to current conditions. In some cases, information about hazards can be updated in real-time and passed backward to approaching vehicles. Road condition information may be used for controlling traffic lights to optimize traffic and avoid congestion and the possibility of accidents. Also, adaptive cruise control or other vehicle control systems can utilize the current information and may be connected with accelerator and brake systems of vehicles, as needed. In some cases, groups of vehicle may travel in unison to save fuel and space on the roads.

As may be understood, the various systems using telematics may require a large amount of data being shared and processed by multiple components (e.g., the vehicles themselves, stationary traffic control systems, remote cloud-based servers, etc.). Usually, there is a need for the data to be high-fidelity. In other words, the data may include a large amount of information that can then be processed. However, the cost to store enormous amounts of data, either on the vehicle itself or in a cloud-based server, can be expensive. Also, the cost of transferring substantial amounts of data can also be expensive. Furthermore, the cost of cloud computing can also be expensive. Therefore, there is a need in the field of telematics to provide systems where relevant data can be communicated, as needed, with other vehicles and with cloud-computing servers located in the cloud. However, instead of communicating substantial amounts of data, there is a need in the field of telematics to reduce the amount of data while preserving the ability of cloud servers to adequately store and process the data to continue to perform the high-fidelity analytics needed for the above-mentioned purposes of safety, vehicle routing, vehicle control, vehicle usage monitoring, performance optimization, etc.

BRIEF SUMMARY

The present disclosure is related to systems and methods for reducing a dataset or telematic load including vehicle operation information within a telematics system. This data reduction procedure can be done for extracting useful data while also preserving the ability of a cloud-based server to perform analytics that would otherwise require full-fidelity data to be transmitted to the cloud-based server.

According to one implementation, a process for extracting vehicle data may include the step of obtaining datasets from a plurality of sensors on a vehicle, where the datasets may include vehicle-related metrics indicative of operations of the vehicle. The process may also include extracting relevant data from the datasets to reduce a telematic load. Also, the process can wirelessly transmit the relevant data to a remote server using an external interface. Specifically, the step of extracting the relevant data may be configured to preserve the ability of the remote server to perform high-fidelity analytics on the relevant data.

In some implementations, the process may further include a step of storing the relevant data in a Solid State Drive (SSD) or any other type of persistent storage device subsequent to the step of extracting the relevant data from the datasets. Also, the step of extracting the relevant data may include utilizing persistent memory and a plurality of nodes that are operationally separate from components used for performing motion functions in the vehicle. For example, each of the nodes may include Random Access Memory (RAM) and a Central Processing Unit (CPU).

Furthermore, the step of extracting the relevant data may include utilizing a) a plurality of metric extraction pods arranged in parallel, b) an orchestration pod, c) a decoding pod for obtaining a DataFrame or similar in-memory data structure from log data and forwarding data in the DataFrame or similar format to the plurality of metric extraction pods, d) a collector pod configured to receive useful metrics from the plurality of metric extraction pods, and/or e) persistent memory having one or more of a decoding (DBC) component, a decoding image component, a metric image component, a metric scripts component, and a main image component.

The process may also include the step of causing the external interface to wirelessly transmit the relevant data to the remote server via a cellular system. The remote server may be a cloud-based server in communication with the cellular system. In some cases, the relevant data may further include Global Positioning System (GPS) data received from one or more GPS satellites.

According to some embodiments, the process may further include the step of sensing or detecting vehicle characteristics related to one or more of location, speed, direction, acceleration, battery temperature, battery usage, air-bag deployment, propulsion usage, accelerator usage, brake usage, vehicle dashboard alerts, etc., and, in some cases, may also include obtaining information regarding traffic and road conditions and the like from one or more of nearby vehicles and roadway signaling equipment.

It will be noted by those of ordinary skill in the art that the concepts of the present disclosure may be applied in vehicles (or a fleet of vehicles), whether internal combustion engine (ICE) vehicles, hybrid vehicles (HEVs), or electric vehicles (EVs), as well as in stationary storage devices, battery charging systems, etc. However, the concepts of the present disclosure need not be applied in an automotive context, but may also be applied to eVTOL, aviation, and hyperloop systems and the like—any systems that need high-fidelity-based metrics with functional-safety relevant ECUs for operation.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
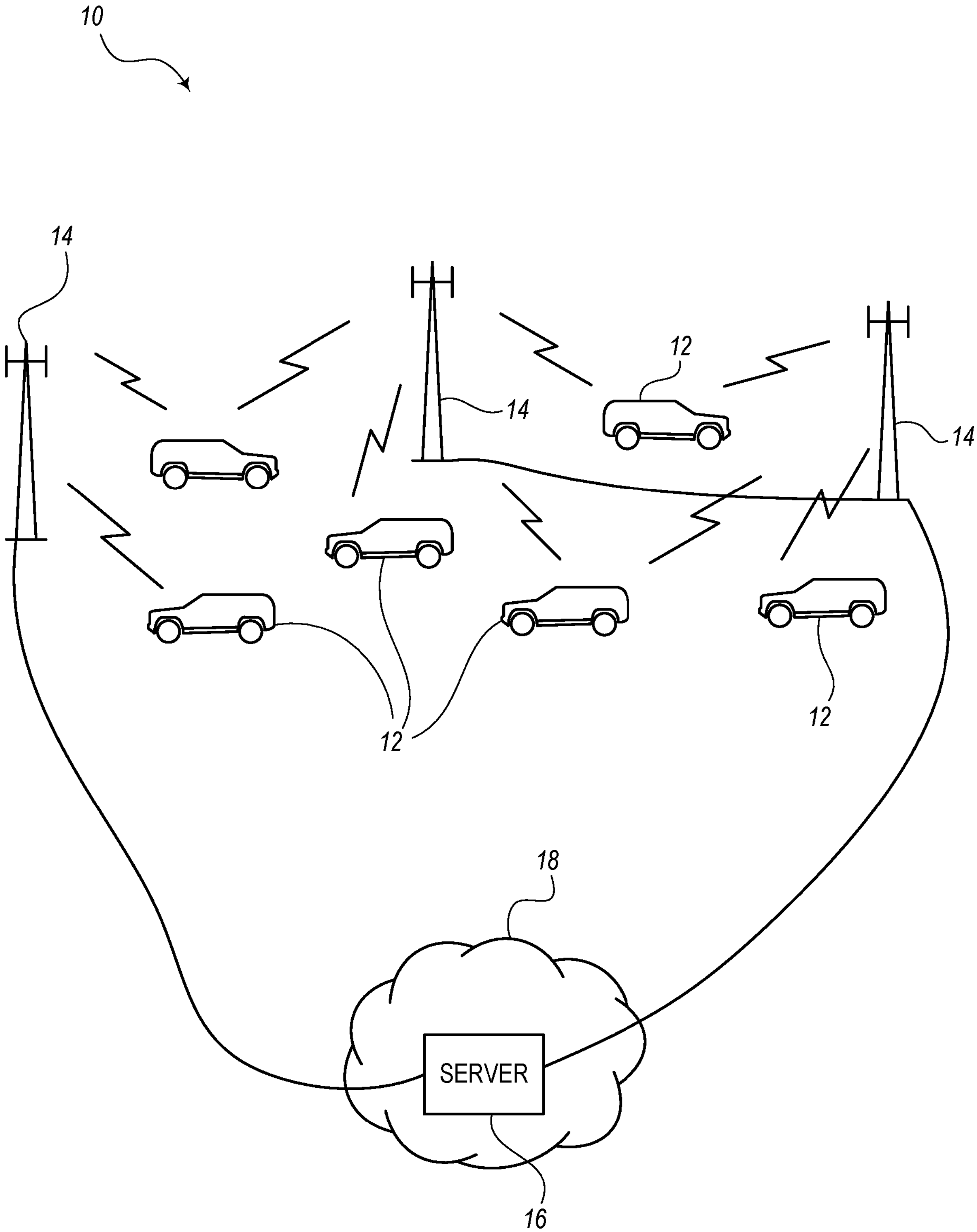
FIG. 1 is a diagram illustrating a vehicle monitoring system for monitoring a plurality of vehicles, according to various embodiments of the present disclosure.

The present disclosure relates to systems and methods for reducing a dataset or telematic load regarding vehicle information of a telematics system while also preserving the ability of a cloud-based server to perform analytics on the reduced dataset that would otherwise require full-fidelity data. The dataset reduction may include vehicle-based processing that is separate from other vehicle computing and control processes involved in the normal operations of the vehicle. In this way, the operational systems of a vehicle will not be overused and/or degraded in this pre-processing reduction of data. Thus, the totality of the raw data can be analyzed in the pre-processing steps in dedicated hardware and software to reduce the dataset to a significantly smaller data load. The reduced load can then be transmitted wirelessly to one or more cloud-based servers for storage and analysis and/or transmitted wirelessly to nearby vehicles for analysis. By significantly reducing the dataset, as described in detail throughout the present disclosure, the transmission costs can be greatly reduced. Also, the cloud computing cost and runtime can be greatly reduced.

Most data analytics systems and methods (or "data science" in general) need high-fidelity data for distinct types of vehicle-related analytics and product understanding. For example, some of these vehicle-related systems may include emergency warning systems, safety systems, Global Positioning System (GPS) navigation systems, driving assistance systems, self-driving systems, vehicle tracking systems, vehicle movement, routing, re-routing, status, battery, propulsion, and behavioral detection systems, road hazard alerting systems, adaptive cruise control systems, automatic braking systems, automatic steering systems, vehicle usage monitoring systems, etc. Of course, each of these various systems may require certain types of information, which can be monitored or sensed on the vehicles themselves and/or by external sensing systems and other nearby vehicles.

However, logging and sending high-fidelity data needed to analyze and understand these vehicle-related systems can be both 1) prohibitively expensive to transmit, particularly at scale with respect to a substantial number (e.g., hundreds of thousands) of vehicles, 2) technically infeasible to store in vehicles due to the degradation of the memory drive of multiprocessing systems and a Telematics Communication Module (TCM) that serves as a communications link between a vehicle and a server with the continuous read/write actions on these memory drives over time. In some cases, a significant amount of degradation over 3-5 years can lead to these memory drives becoming compromised. At the same time, low-fidelity data does not meet the needs of these data analytics systems. Therefore, a problem in this respect is how to perform vehicle analytics and run Machine Learning (ML) models that need high-fidelity data if only low-fidelity data is available, particularly when these analytics systems are operating at scale with a large number of vehicles operating at the same time.

To address this issue, the present disclosure provides various embodiments of the systems and the methods for reducing a dataset of a vehicle telematics load while also preserving the ability of vehicle-based analytics systems and/or cloud-based analytics systems to perform high-fidelity analytics on the reduced data load. In some respects, hardware, software, firmware, etc. may be used in a dedicated fashion for performing these data reduction procedures (or data extraction procedures) before the raw vehicle-based data is stored or processed by the different analytics systems, thereby reducing the load on these analytics systems. This hardware, software, firmware, etc. for extracting relevant data from the raw data may be referred to as "Dataware" or a "data processing device" and may include a combined framework to solve the above problem. This "data extraction unit" or "Dataware" or "data processing device" may be considered as a new notion of the technology stack that sits on top of the hardware, software, and firmware layers. Thus, the "Dataware" is a separate, modular layer that sits on top of the vehicle stack and performs its functions, is updated, etc. while being completely isolated from critical vehicle operations.

From a physical standpoint, data extraction unit (Dataware) may be an in-vehicle cluster, isolated from regular vehicle operations that performs in-situ data analysis, metric extraction, and/or ML inference. The data extraction unit may then send the outputs of the highly reduced data volume to the cloud. Hardware alone may not be enough in this case, so Dataware may also embody various protocols and software system needed to enable this data extraction on the vehicle itself. Thus, the data extraction unit (Dataware) may allow the computing systems on a vehicle to run analysis/extractions on the necessary high-fidelity data while only sending minimal amounts of data via telematics to external computing systems in other vehicles or in the cloud. In some cases, the reduced data may be wirelessly communicated via long range communication (e.g., satellite-based systems, Global Positioning System (GPS), etc.), cellular communication protocols (e.g., Long-Term Evolution (LTE), etc.), and/or short range radio communication (e.g., Ultra-Wide Band (UWB), Wi-Fi, Bluetooth, etc.). Dataware effectively allows cloud processing and data transfer to be moved to the individual vehicle to run data reduction/extraction in-vehicle, which thereby enables a massive cloud-processing and cloud-storage cost reduction.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in numerous ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an embodiment of a vehicle monitoring system 10 for monitoring a plurality of vehicles 12. As shown, the vehicle monitoring system 10 includes a plurality of cell towers 14, each configured to wirelessly communicate with the vehicles 12 that are within communication range of the respective cell tower 14. The cell towers 14 are configured to receive reduced datasets from each of the vehicles 12 in range and pass this information to a server 16 arranged in a cloud 18. In this respect, the server 16 is considered to be a cloud-based server for the purpose of performing any suitable types of cloud-computing services related to vehicle tracking, routing, safety, etc. Each vehicle 12 may be configured to supply cellular, real-time updates (in reduced or extracted form) during its operation. It will be readily apparent to those of ordinary skill in the art that the vehicle network does not have to be cellular based, but could also utilize wireless, near-field, and/or other conventional and novel technologies equally.

When the server 16 receives the reduced data from one or more vehicles 12, the server 16 is configured to store the data in memory and/or perform several types of cloud computing action on the information, depending on the type of service being performed. The results of the cloud-computing by the server 16 may include information to be stored in the memory and/or information that is to be transferred back to one or more of the vehicles 12. For the information to be communicated to the vehicles 12, the information is passed to one or more of the cell towers 14, which is then configured to wirelessly communicate with the vehicles 12 as needed. It may be noted that since each vehicle 12 may be in motion, the server 16 may need to determine one or more cell towers 14 that are the most likely to reach the vehicles 12, based on known location and direction information of each vehicle 12. The information communicated to the vehicles 12 may also be passed to the vehicles 12 via a non-cellular, wireless network.

According to additional embodiments, the vehicle monitoring system 10 may further include stationary or mobile sensing detection systems in communication with the server 16 for relaying vehicle information. Also, the vehicle monitoring system 10 may include one or more satellites configured to assist a vehicle 12 with global positioning information and/or for communicating vehicle location/direction information to the server 16.

Normally, each vehicle 12 may include a computing system. The vehicle computing system may include various control/operational devices and networks (e.g., one or more Electronic Control Units (ECUs), one or more Central Processing Units (CPUs), various memory devices (e.g., Random Access Memory (RAM), etc.), an on-board network (e.g., a Local Interconnect Network (LIN), Controller Area Network (CAN), Ethernet Network, etc.), a telematics system, a logging system, a wireless communication system, etc. The computing system of each vehicle 12 may be configured to perform some functions on the vehicle 12 itself, while some functions are communicated to the server 16 for cloud computing services. One of the goals of the present disclosure, therefore, is to reduce the amount of data that is transmitted to the server 16 to reduce the transmission cost and reduce the cloud-computing cost. FIGS. 2-5 demonstrate some general systems for the transmission of vehicle telematics data between a vehicle 12 and the server 16 and show the details of data logging/analytics systems.

Figure 2:
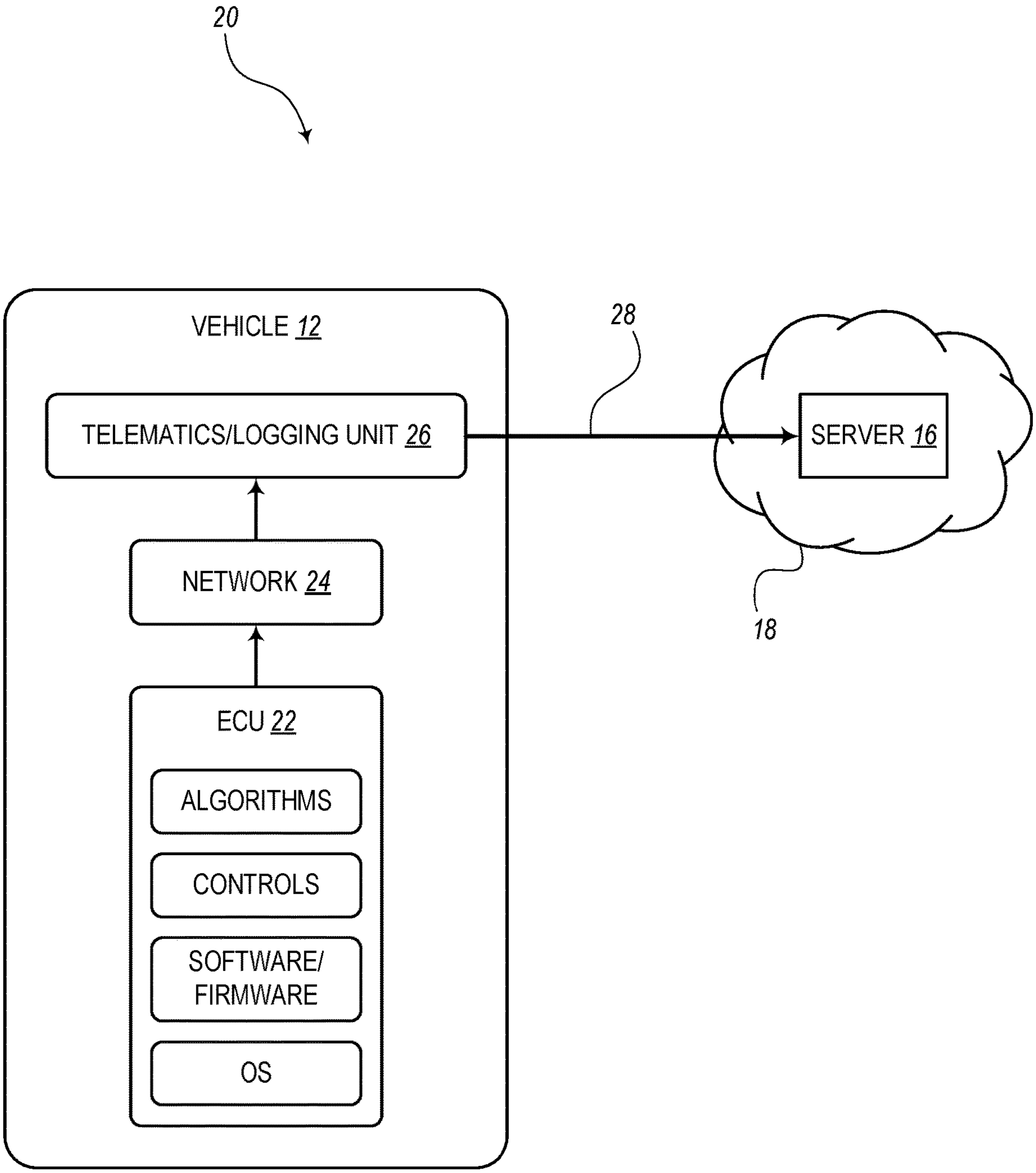
FIG. 2 is a block diagram illustrating an individual vehicle telematics system for communications with a remote server, according to various embodiments.

FIG. 2 is a block diagram illustrating an embodiment of a vehicle telematics system 20. In this embodiment, the vehicle telematics system 20 includes a vehicle 12 in communications with the server 16 in the cloud 18. The vehicle 12 may include an Electronic Control Unit (ECU) 22 or other control/operational device. The ECU 22 may include an Operating System (OS) (e.g., Linux), software/firmware and controls (e.g., C), algorithms (e.g., Simulink), etc. The vehicle 12 in this embodiment also includes a network 24 over which the ECU 22 communicates. The network 24 may include LIN, CAN, Ethernet, or other suitable networking systems on the vehicle 12. The vehicle 12 further includes a telematics/logging unit 26 for communicating data (e.g., via Wi-Fi, cellular, LTE, etc.) to the server 16 for logging and processing purposes. The transmitted signals 28 from each ECU 22 may be captured and logged in Packet Capture (PCAP) logs, Application Programming Interface (API) logs, high-fidelity data, low-fidelity data, etc. In some respects, the vehicle telematics system 20 may represent an existing data communication system. As used herein, a PCAP log is illustrative only and may refer to any full-fidelity log file, without limitation.

Figure 3:
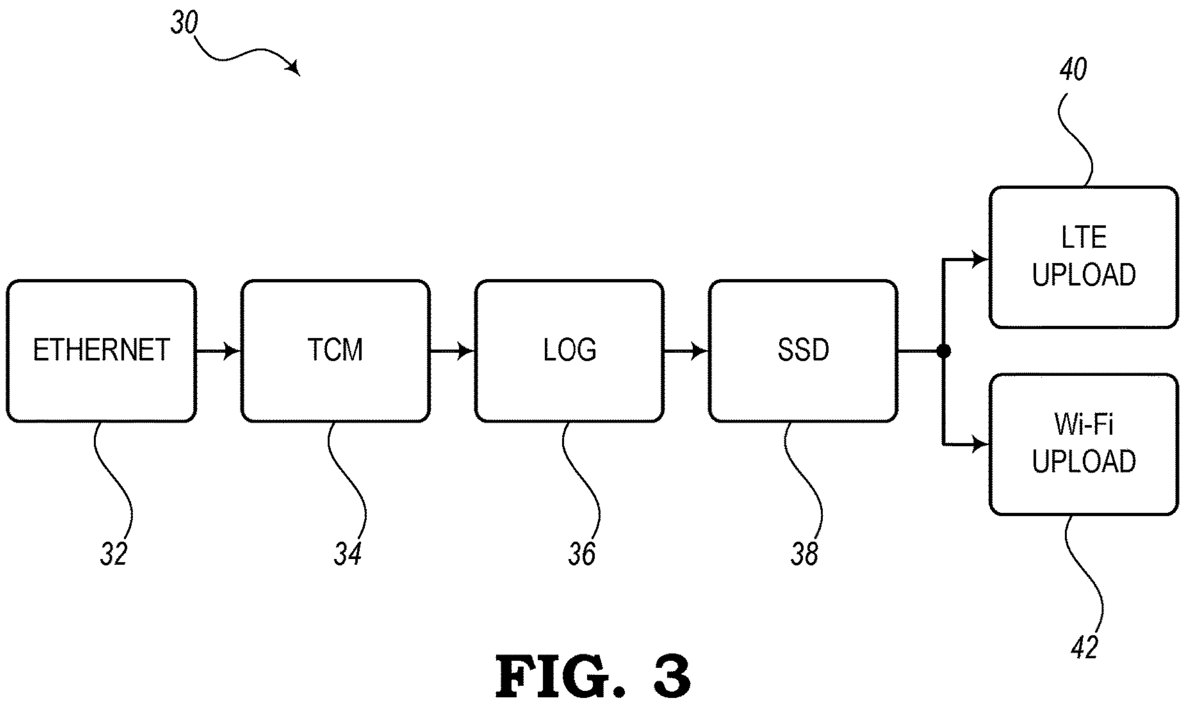
FIG. 3 is a block diagram illustrating another vehicle telematics system with local storage and remote upload capabilities, according to various embodiments.

FIG. 3 is a block diagram illustrating another embodiment of a vehicle telematics system 30. In this embodiment, the vehicle telematics system 30 may include local storage capabilities as well as remote upload capabilities and may represent an existing high-fidelity logging system. The vehicle telematics system 30 may include an Ethernet (or other network) system 32, a telematics communications module (TCM) device 34, a PCAP log device 36 or the like for storing high-fidelity data (e.g., ten-minute full-fidelity logs), and a Solid State Drive (SSD) (or other persistent storage device) 38. As used herein, the TCM device 34 refers to any device or module that is operable for logging data and externally communicating data. These data logging and external communication functions can be performed by different devices or modules, by sub-devices or modules within the same device or module, or by different devices or modules, all collectively referred to herein generally as the TCM device 34. It will be readily apparent to those of ordinary skill in the art that, although the SSD 38 is used herein by way of illustration and for simplicity, the SSD 38 may refer to any other type of persistent storage device equally and without limitation. The Ethernet system 32, TCM device 34, PCAP or similar log device 36, and SSD 38 may be part of a vehicle network. The SSD 38 (or similar persistent storage device) may be used to store high-fidelity data and then upload the data using an LTE upload action 40 and/or a Wi-Fi upload action 42 for uploading the high-fidelity data to a remote processing system (e.g., server 16) as part of a telematics procedure. Again, the vehicle telematics system 30 of FIG. 3, in some respects, may represent an existing data communication system.

The following is an example of the use of the on-board SSD 38 and remote cloud-based processing when high-fidelity data is not reduced. In this example, it may be assumed that a vehicle logs 100 to 150 MB every 10 minutes on the PCAP log device 36 (e.g., about 125 MB per 10 minutes on average). Also assume that each vehicle operates for an average of one hour in a day, which may result in about 0.75 GB/day of transmitted data. Also assume that there are one million vehicles being monitored in a region or country (e.g., United States), which results in 750 TB/day of transmitted data. Over the course of one year, this results in a total of 273,750 TB of data being transmitted, processed, stored in the cloud, etc. Therefore, there is a need to reduce the amount of raw data being transmitted, logged, and processed.

Figure 4:
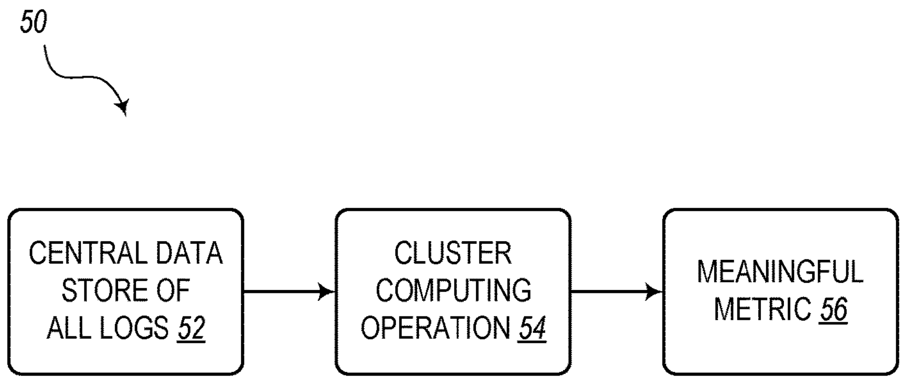
FIG. 4 is a block diagram illustrating a processing pipeline of a server computing vehicle data in the cloud, according to various embodiments.

FIG. 4 is a block diagram illustrating an embodiment of a processing pipeline 50 of a server configured to compute vehicle data in the cloud. The processing pipeline 50 (or processing pattern) may include a central data store for storing all of the received logs from multiple vehicles, as indicated in block 52. Logs of time-series data may be crawled in the cloud to extract metrics used for analytics, ML models, etc. The processing pipeline 50 may also include a cluster computing operation 54, which may be a massive ETL (extract, transform, load) or similar operation on a cluster using Spark, Hadoop, Pandas, or the like. For example, these operations may group data by Vehicle Identification Number (VIN), date, source log, etc. and may apply the cluster computing in Spark modules, Pandas modules, Python modules, etc., which may be configured to produce a table of extracted meaningful metrics 56 that can be used for processing the data for performing useful services for the vehicles.

Figure 5:
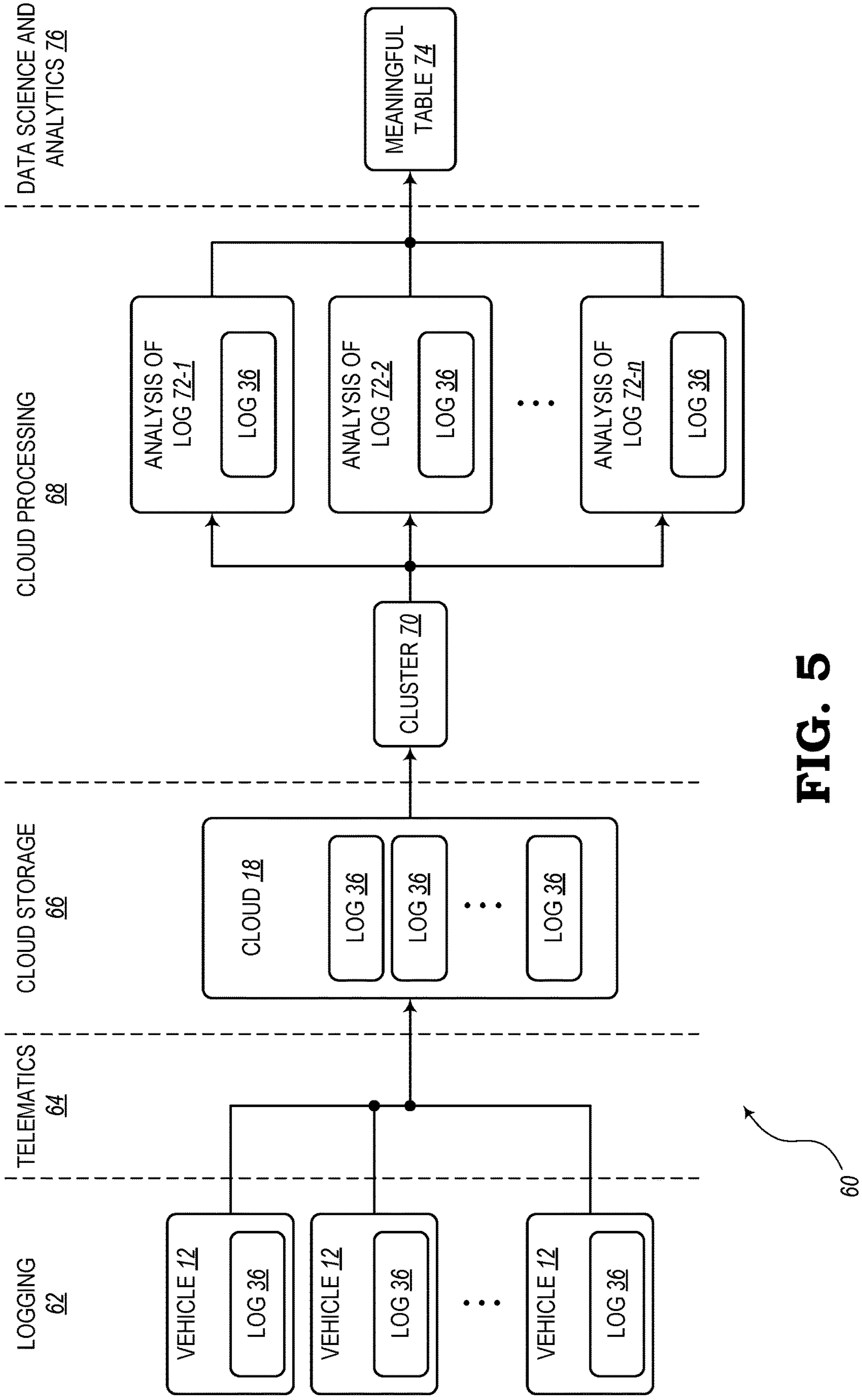
FIG. 5 is a block diagram illustrating operations of the vehicle monitoring system of FIG. 1, according to various embodiments.

FIG. 5 is a functional diagram 60 showing an embodiment of operations of the vehicle monitoring system 10 of FIG. 1 using one or both of the vehicle telematics systems 20, 30 of FIGS. 2 and 3, respectively. The functional diagram 60 may represent existing systems and methods for communicating high-fidelity data or raw (non-reduced) data. The functional diagram 60 includes a logging stage 62 where PCAP logs 36 or the like are created in the vehicles 12. A telematics stage 64 includes the expensive process of transmitting all the PCAP logs to the cloud 18.

The functional diagram 60 also includes a cloud storage stage 66, where the server 16 is configured to store all the PCAP logs 36 or the like in the cloud 18. Next in the functional diagram 60 is a cloud processing stage 68. The cloud processing stage 68 is also quite expensive and includes a cluster step 70 and a plurality of n parallel steps 72-1, . . . **72-*n* of analyzing the PCAP logs 36. From these multiple steps 72-1, . . . , 72-*n*, the functional diagram 60 creates a meaningful table 74 of data and a data science and analytics stage 76 where the meaningful table 74 is analyzed. The functional diagram 60 essentially packs and unpacks substantial amounts of data to obtain small piece of meaningful information (i.e., the meaningful table 74). It is the functionality of the cloud processing stage 68 that the present disclosure effectively and advantageously moves to the new Dataware device 100 (FIG. 7), 116 (FIG. 8**).

The data flow articulated in the functional diagram 60 may be attempted to be reduced by turning the ECU 22 into a logger, using control systems to estimate distributions and extract values (e.g., like a distribution of current and temperature for a battery State of Health (SOH) monitor), sending that value over CAN, etc. However, the ECUs 22 should be used for performing functional operations and controls, not for logging and data calculations. Also, ECUs 22 normally have limited memory (e.g., RAM, flash storage, etc.) intended for storing calibrations and persisting values.

Also, ECUs can only be updated at reasonable Over-the-Air (OTA) times based on the use of the vehicle. It should also be noted that there may be functional safety implications to any ECU code changes or memory-intensive operations, like data processing. Another problem is that ECUs cannot process longer temporal periods that may be needed in data analysis.

Furthermore, attempts may be made to solve the data problem by limiting the signals that are logged. This becomes difficult to implement with the extensive suite of signals needed for development, as well as cross-team interdependencies. Also, there may be too many core processes to model and understand such that an OEM may not achieve a 100-1000× volume reduction in data. Even a 10× reduction (or reducing to 10% of the total raw data) may be a bold goal with this approach.

In the past, some solution may include novel compression methods or file format methods. For example, PCAP logs or the like may already be highly compressed compared to their decoded counterparts. However, it may difficult or nearly impossible to achieve a 100× to 1000× reduction needed in this respect.

Thus, the problem of an over-abundance of raw data (e.g., PCAP logs 36 or the like) can lead to excessive costs for the server 16 and to Original Equipment Manufacturers (OEMs) that produce the vehicles. Similar issues of excessive costs associated with an over-abundance of data may affect other industries, such as the production and use of other operational mobile products (e.g., vehicles, planes, trains, boats, etc.) and/or stationary products (e.g., household appliances, personal computers, entertainment equipment, etc.). These mobile or stationary products in this context refer to those products that are configured to be connected to the Internet (e.g., via wired or wireless communication) to enable servers or other service-based systems to perform analytics on these products. The servers may require high-fidelity, time-series data to perform the diverse services, but are unable to do so using conventional systems. Therefore, the systems and methods of the present disclosure are configured to reduce the size of the datasets at the product itself to prevent the storage and processing of too much raw data.

Therefore, some of the principles for some solutions to the above-mentioned problems, according to the embodiments of the present disclosure, may include data analysis and/or metric extraction that may function separately from operational controls and algorithms of regular vehicle usage. There should be no Functional Safety (FuSa) implications for data analysis/metric extraction code. Also, the present solutions may include data analysis and/or metric extraction that should be done in a computing language designed for this type of environment (e.g., Python or Go, not C or Simulink-compiled models). In addition, present solutions may function whereby changes to data analysis and/or metric extraction should be completely independent from changes or updates to ECU software. In this regard, changes can be more frequent than vehicle software OTA releases.

Figure 6A:
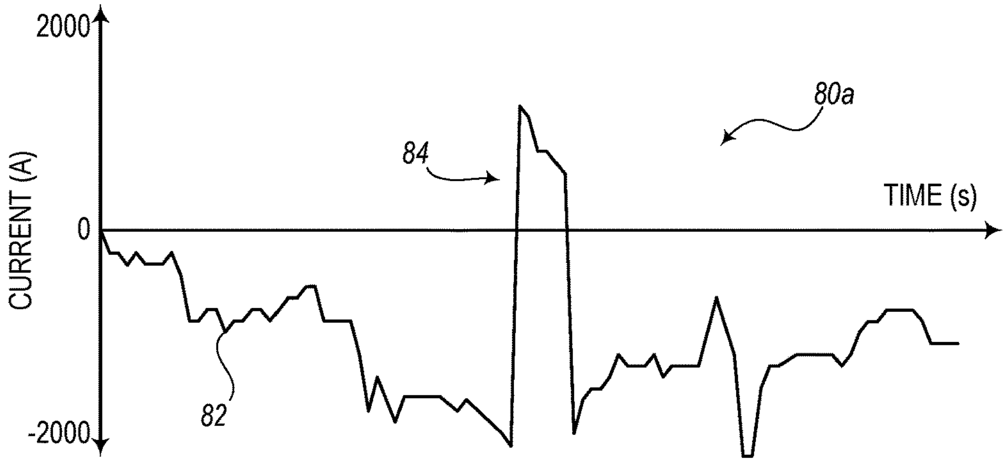
FIGS. 6A-6C are graphs illustrating an example of a data reducing solution for obtaining low-fidelity data.
Figure 6B:
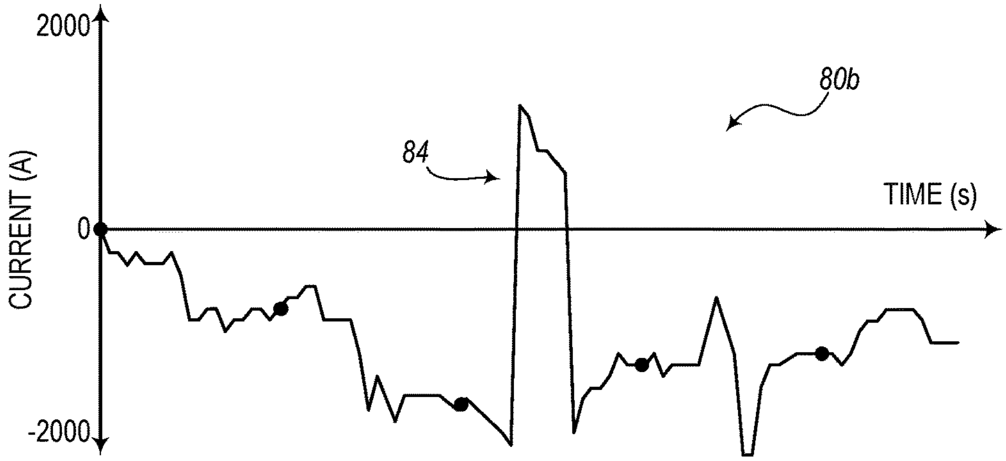
Figure 6C:
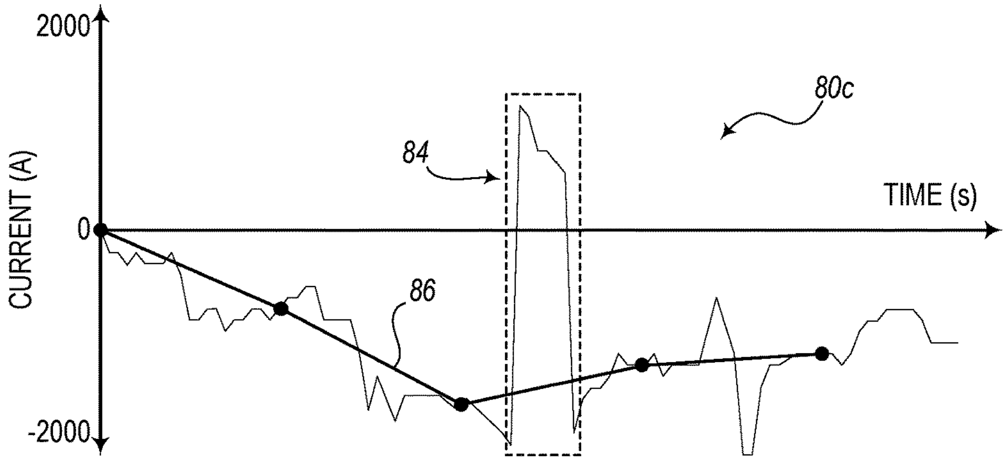

FIGS. 6A-6C show graphs 80*a*, 80*b*, and 80*c*, which illustrate an example of a data reducing solution related to high-fidelity data processing for obtaining low-fidelity data. As shown in graph 80*a* of FIG. 6A, vehicle current is measured over time to obtain time-series data 82 in its raw form. One characteristic of the time-series data 82 is the presence of a large, positive current pulse 84, which may represent a regenerative braking process where a vehicle's kinetic energy is converted to electrical energy to recharge a battery, slowing the vehicle in the process. Thus, the time-series data 82 represents a sample of a full-fidelity trace, where negative current occurs when the vehicle is powered by the battery during a normal driving stage and where positive current occurs when the vehicle is braking and a regenerative process is applied to the battery during braking.

In FIG. 6B, the graph 80*b* shows a basic low-fidelity data sampling process where a significantly reduced number of data samples are taken every N seconds. When the five data points are analyzed and plotted, as seen in FIG. 6C, a problem can become apparent. That is, the low-fidelity data plot 86 of FIG. 6C omits the critical information related to the entire regenerative pulse 84. Therefore, sending the low-fidelity data at this point does not work since some critical information has been omitted. A balance between high-fidelity data at scale and unintelligent low sampling rate to reduce the dataset size is needed to reduce data more intelligently to a reasonable dataset size without losing information needed for performing high-fidelity analytics.

Sending low-fidelity data includes a consideration of a) cost over LTE, which is typically expensive, and b) logging and waiting for Wi-Fi availability, which does not meet certain customer needs since a vehicle may not often encounter hot spots of Wi-Fi access and since the SSD 38 of the TCM 34 may experience significant degradation after 3-5 years of operating with an excessive read/write rate. Also, low-fidelity data does not meet certain analytics needs of the server 16. This leads again to the question of how to perform analytics and run ML models that need high-fidelity data if high-fidelity data is not transmitted to the server at scale (e.g., hundreds of thousands of vehicles).

Thus, one agenda may include operating within an existing data generation system, performing data processing methods, and attempting to perform certain solutions to overcome the above-stated issue using specific principles, and creating solutions and technical details to achieve success. A desired result, therefore, is to intelligently reduce a dataset of raw data (e.g., a telematic load) related to characteristics of multiple vehicles in a telematics system. The data reduction is performed by the embodiments of the present disclosure, however, while also preserving the ability of a cloud-based server to perform high-fidelity analytics on the reduced dataset without compromising the quality of cloud-based computing and analytics.

Figure 7:
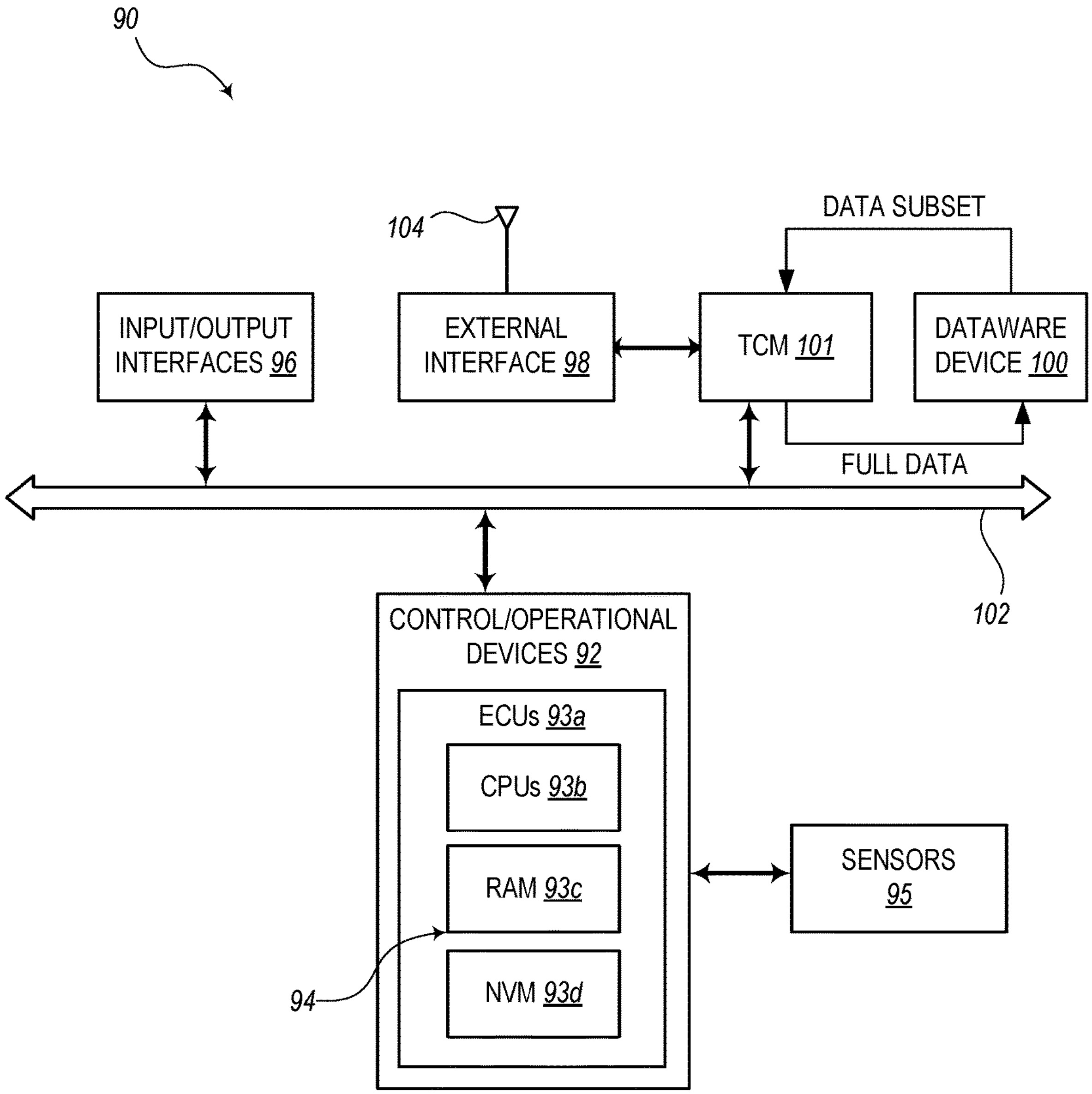
FIG. 7 is a block diagram illustrating a system and network structure (such as a Local Interconnect Network (LIN), Controller Area Network (CAN), Ethernet Network, etc.) of a vehicle, according to various embodiments of the present disclosure.
Figure 8:
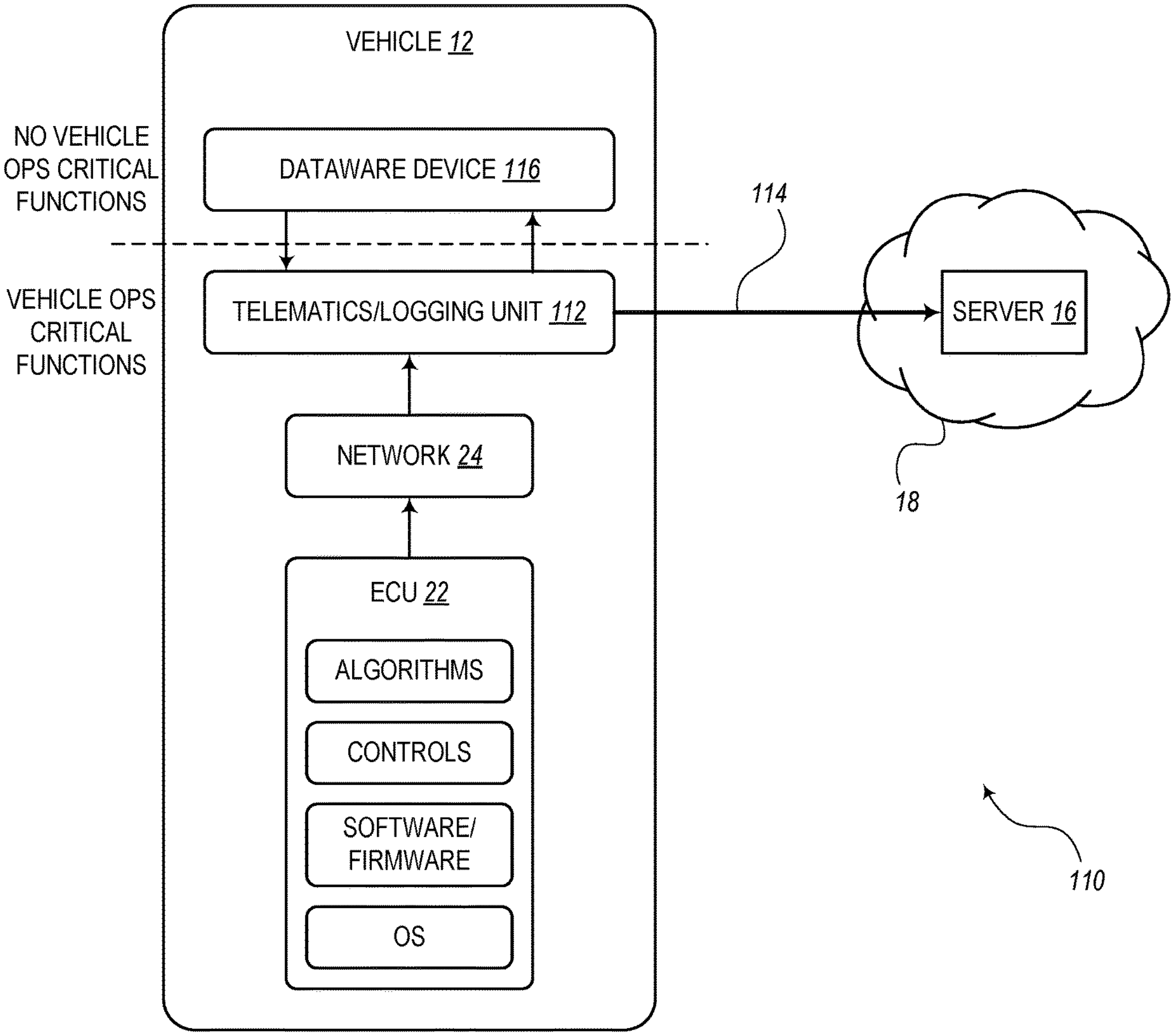
FIG. 8 is a block diagram illustrating another individual vehicle telematics system for communications with a remote server, according to various embodiments of the present disclosure.

FIG. 7 is a block diagram illustrating an embodiment of a system and Local Interconnect Network (LIN), Controller Area Network (CAN), Ethernet Network, etc. 90 of a vehicle (e.g., vehicle 12) operating within an area where data can be transmitted to a server (e.g., server 16) for remote logging and processing of data representing a reduced telematic load, in accordance with the present disclosure. In the illustrated embodiment, the system 90 may be a digital computing structure that generally includes one or more control/operational devices 92, such as one or more ECUs 93*a*, coupled to the LIN, CAN, Ethernet Network, etc. 102. As alluded to previously, the ECUs 93*a* are associated with critical and non-critical vehicle operational functions and receive signals from one or more vehicle sensors or sensor clusters 95. For example, one ECU 93*a* could be a battery management ECU in an electric vehicle (EV), coupled to sensors for monitoring voltage, current, temperature, etc. Each ECU 93*a* typically includes a CPU 93*b*, transitory memory 93*c*, and permanent, non-volatile memory 93*d*, the latter of which collectively form a memory device 94. The system 90 also includes Input/Output (I/O) interfaces 96 and an external interface 98 coupled to the network 102. Further, the TCM 101 is coupled to the network 102 and communicates with the ECUs 93*a*. It should be noted here that the TCM 101 generally represents and refers to a data logging device or module, and may itself be implemented as part of an ECU or the like. This data logging device or module may itself include the external interface 98, or it may simply be in communication with the external interface. Thus, as used herein, the TCM 101 refers to a data logging device or module that may incorporate or utilize an external communication capability, such as cellular, WiFi, etc. A Dataware device 100 (or database extraction unit 116 (FIG. 8)) is coupled to and communicates with the TCM 101, while being segregated from the ECUs 93*a* and operational functions of the vehicle. The Dataware device 100 and the instructions executed thereby may thus be operated, altered, and updated without affecting critical vehicle operations handled by the ECUs 93*a*. The Dataware device 100 receives full datasets from the TCM 101 and processes these full datasets to return data subsets consisting of extracted metrics, test results, or reduced datasets to the TCM 101 for subsequent storage and/or communication to an external server via the external interface 98, for example. The Dataware device 100 may utilize its own processing devices, memory, etc. It should be appreciated that FIG. 7 depicts the system 90 in a simplified manner, where some embodiments may include additional components and suitably configured processing logic to support known or conventional operating features. The components (i.e., 92, 94, 95, 96, 98, 100) may be communicatively coupled via the local interface or network 102. The local interface 102 may include, for example, one or more buses or other wired or wireless connections. The local interface 102 may also include controllers, buffers, caches, drivers, repeaters, receivers, among other elements, to enable communication. Further, the local interface 102 may include address, control, and/or data connections to enable appropriate communications among the components 92, 94, 95, 96, 98, 100.

It should be appreciated that the control/operational device 92, according to some embodiments, may include one or more Electronic Control Units (ECUs) 93*a* for controlling vehicle operations and one or more CPUs 93*b*. The control/operational device 92 may include or utilize one or more generic or specialized processors (e.g., microprocessors, ECUs, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The control/operational device 92 may also include or utilize stored program instructions (e.g., stored in hardware, software, and/or firmware) for control of the network 90 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 94 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 94 may incorporate electronic, magnetic, optical, and/or other types of storage media. The memory device 94 may have a distributed architecture, where various components are situated remotely from one another, but can be accessed by the processing device 92.

The memory device 94 may include a data store, database, or the like, for storing data. In one example, the data store may be located internal to the network 90 and may include, for example, an internal hard drive connected to the local interface 102 in the network 90. Additionally, in another embodiment, the data store may be located external to the network 90 and may include, for example, an external hard drive connected to the Input/Output (I/O) interfaces 96 (e.g., SCSI or USB connection). In a further embodiment, the data store may be connected to the network 90 through a network and may include, for example, a network attached file server.

Software stored in the memory device 94 may include one or more programs, each of which may include an ordered listing of executable instructions for implementing logical functions. The software in the memory device 94 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., control/operational device 92), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the control/operational device 92 or other suitable circuitry or logic). For example, when executed, the instructions may cause or enable the control/operational device 92 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., control/operational device 92), or any suitable combination thereof. Software/firmware modules may reside in the memory device 94, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

In some embodiments, the sensors 95 may include any suitable equipment for detecting any type of parameter, characteristic, condition, status, usage, etc. of the vehicle on which the system 90 is employed. The sensors 95 may detect location, speed, direction, external temperature, battery temperature, battery voltage, battery current, battery usage, propulsion usage, acceleration, vehicle roll detection, airbag deployment, accelerator usage, brake usage, vehicle warnings and alerts, status of nearby vehicles, road obstructions, road construction status, traffic conditions, etc. The sensors 95 may obtain raw data, which may thereby be reduced to a more reasonable dataset size using the systems and methods of the present disclosure.

The I/O interfaces 96 may be used to receive user input from and/or for providing system output to one or more devices or components. For example, user input may be received via one or more of a keyboard, a keypad, a touchpad, and/or other input receiving devices. System outputs may be provided via a display device, monitor, User Interface (UI), Graphical User Interface (GUI), and/or other user output devices. I/O interfaces 96 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The external interface 98 may be used to enable the TCM 101 to communicate over a wireless network (e.g., via cell towers 14, satellites, etc.), the Internet, a Wide Area Network (WAN), a Local Area Network (LAN), vehicle battery charging stations, and the like. In some embodiments, the external interface 98 may include one or more antennas 104 or other suitable structure for wirelessly communicating radio signals with the cell towers 14, satellites, nearby vehicles, nearby traffic information stations, or other external devices or systems related to detecting or communicating vehicle and/or traffic information to the vehicle on which the network 90 is disposed. In a wired communication setting (e.g., when the vehicle is at rest and connected via Ethernet cables to a stationary communication station), the external interface 98 may include, for example, wired Ethernet communication equipment, such as an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The external interface 98 may include address, control, and/or data connections to enable appropriate communications on a network (e.g., connected to the cloud 18 and/or server 16). The external interface 98 may be configured with telematics modules for communicating vehicle parameters. In some embodiments, the external interface 98 and/or I/O interfaces 96 may include GPS equipment (e.g., GPS sensors) for allowing the detection of location and/or routing information.

It should be noted that the Dataware device 100 of the system 90 may be configured to operate substantially independently of the rest of system 90. The Dataware device 100 may ultimately receive data from the control/operational device 92 and sensors 95 or data obtained by way of user input using the I/O interfaces 96. This received data can be pre-processed by the Dataware device 100 in a way to reduce the size of the dataset to include only the information needed for performing various vehicle-related services and analytics. The Dataware device 100 can reduce the data significantly to thereby reduce the cost of data transmission (e.g., telematics stage 64), the cost of data storage (e.g., cloud storage stage 66), and reduce the cost of the cloud processing stage 68 and data science and analytics stage 76 (FIG. 5).

The following implementations of the Dataware device 100 and/or other data reduction/extraction systems of FIGS. 8-12 consider a new layer in a data processing stack. In some respects, the following embodiments may be referred to as preferred embodiments in the present disclosure and are believed to include advantages over the previously described embodiments. The Dataware device 100 again may be isolated from any control/operational devices or networks critical to regular vehicle operation (e.g., steering, braking, navigation, sensing, etc.). While the regular vehicle operation may include certain operational dependencies, the Dataware device 100 may include a layer that is completely isolated from these other vehicle functions and may have no operational dependencies.

Therefore, according to some embodiments, a network operating a vehicle may include a plurality of sensors (e.g., sensors 95), an external interface (e.g., external interface 98), a control/operational device (e.g., ECU 22, control/operational device 92, Dataware device 100, nodes 124, CPUs, data extracting unit 140, compute cluster 142, etc.), and a memory device (e.g., data extraction unit 140). The memory device (e.g., using the data extraction unit 140) may be configured to store a computer program having instructions that, when executed, enable the processing device to obtain datasets from the plurality of sensors. For example, the datasets may include vehicle-related metrics indicative of operations of the vehicle. The instructions may further enable the Dataware device to extract relevant data from the datasets to reduce a telematic load. Furthermore, the instructions may enable the Dataware device to cause the external interface to wirelessly transmit the relevant data to a remote server. The action of extracting the relevant data may be configured to preserve the ability of the remote server to perform high-fidelity analytics on the relevant data.

FIG. 8 is a block diagram illustrating another embodiment of a vehicle telematics system 110 for communications with a remote server (e.g., server 16 of cloud 18). The vehicle telematics system 110 of FIG. 8 include many similarities with the vehicle telematics system 20 of FIG. 2 and includes the ECU 22 and network 24 similar to the vehicle telematics system 20. However, the vehicle telematics system 110, as illustrated in the embodiment of FIG. 8, further includes a telematics/logging unit 112 that is configured to perform an extra step before transmitting metrics 114 to the server 16. Also, the vehicle telematics system 110 includes a Dataware device 116 (or data reduction/extraction device), which may have similarities to the Dataware device 100 shown in FIG. 7. The telematics/logging unit 112, for instance, includes the extra step of interfacing with the Dataware device 116 to allow the Dataware device 116 to reduce the dataset by extracting the relevant data useful for performing various vehicle-related services.

Figure 9:
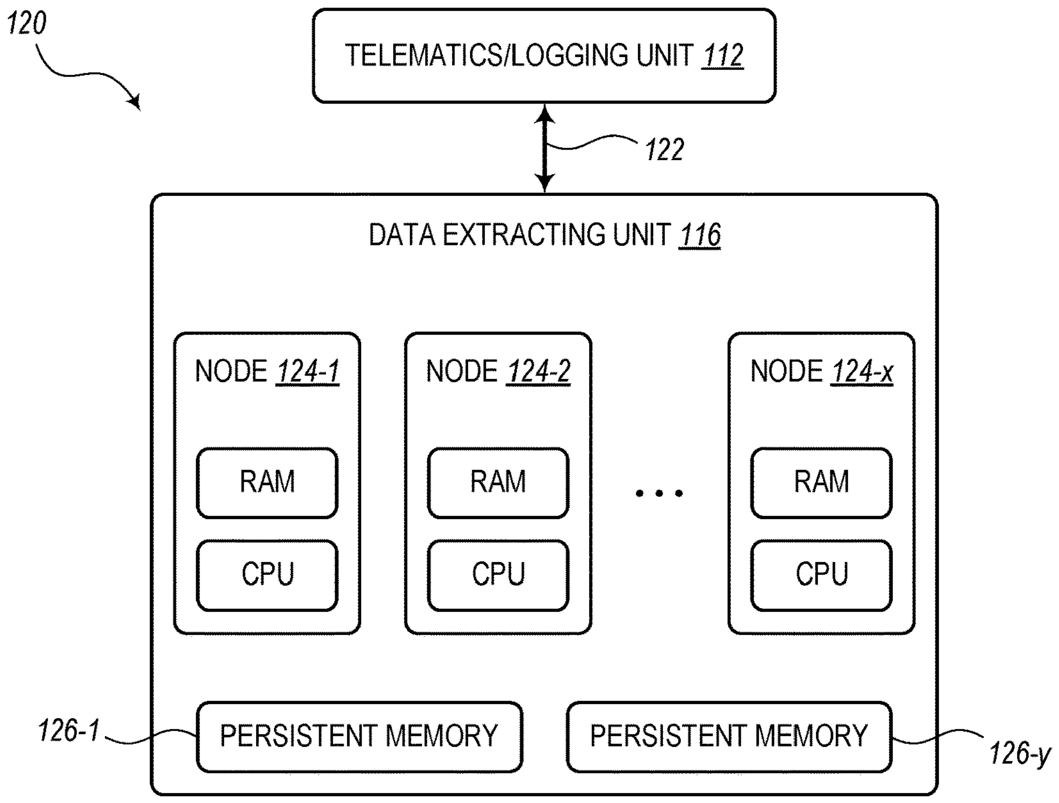
FIG. 9 is a block diagram illustrating a data extracting unit coupled to the individual vehicle telematics system of FIG. 8, according to various embodiments.

FIG. 9 is a block diagram illustrating a section 120 of the vehicle telematics system 110 of FIG. 8 and shows the telematics/logging unit 112 and the Dataware device 116 (or other suitable data reduction and/or extracting unit). The telematics/logging unit 112 may be configured to communicate with the Dataware device 116 via Ethernet equipment 122. The Dataware device 116 may include a cluster of nodes (e.g., units, modules, elements, etc.) 124-1, 124-2, . . . , 124-*x*. Each node 124 in the cluster includes RAM and a CPU. The Dataware device 116 also include one or more persistent memory units 126-1, . . . 126-*y*. The nodes 124 in the cluster are arranged in communication with the persistent memory units 126.

The Dataware device 116 is configured to reduce data load while preserving full-fidelity analytics without compression, which is typically the most common method for reducing the size of a dataset. However, regular compression algorithms do not deliver the 100× data reduction that may be needed to significantly reduce the size. Nevertheless, compression may still be used to augment the data reduction/extraction functions of the embodiments of the present disclosure, such as the reduced dataset resulting from the operations of the Dataware device 116.

Also, the Dataware device 116, again, may be arranged to be completely separate from the operational controls and algorithms of regular vehicle functionality. This enables the Dataware device 116 to be updated independently of the vehicle's Over-the-Air (OTA) communication (e.g., wireless communication systems) and is configured to have no functional safety implications.

The Dataware device 116 may be configured to run with data-first languages (e.g., Python, Go, etc.) compared to embedded languages (e.g., C, etc.) that are not designed for data analytics/data science/ML inference. In addition, the configuration of arranging a cloud-connected cluster of nodes 124-1, 124-2, . . . , 124-*x*, which are each configured to run "pods" inside the vehicle for real-time data analytics is different from other conventional systems and therefore enables functions that are unavailable in the conventional systems.

For example, a data cluster or allocation block may refer to units of memory (e.g., RAM) combined with units of compute (e.g., CPU). The grouping of memory and compute resources within the cluster enables finely-tuned resource allocation when performing operations on the cluster. A "pod," as used in the present disclosure, may refer to a set of computing elements linked within the Kubernetes or other compute structure. Pods offer distributed, fault-tolerant, parallel operations within a cluster. In some embodiments, a pod may be defined as one container (or a small number of containers that are tightly coupled and share resources). These clusters and pods may be similar to the structure of some microprocessors and supercomputers as well as other cloud-computing services. Thus, this advanced infrastructure may be implemented with the vehicle computing system as well to provide high-fidelity operation and thereby move the complex functionality of cloud-computing to the vehicles themselves.

As described in the present disclosure, persistent memory may refer to any method or apparatus for enabling data structures to be stored efficiently in order that the data structures can be accessible using memory instructions or memory APIs, even after the end of a process that created or last modified them. Persistent memory, unlike non-volatile random-access memory (NVRAM), is related to the concept of persistence in its emphasis on a program state that exists outside a fault zone of the process that created it.

Figure 10:
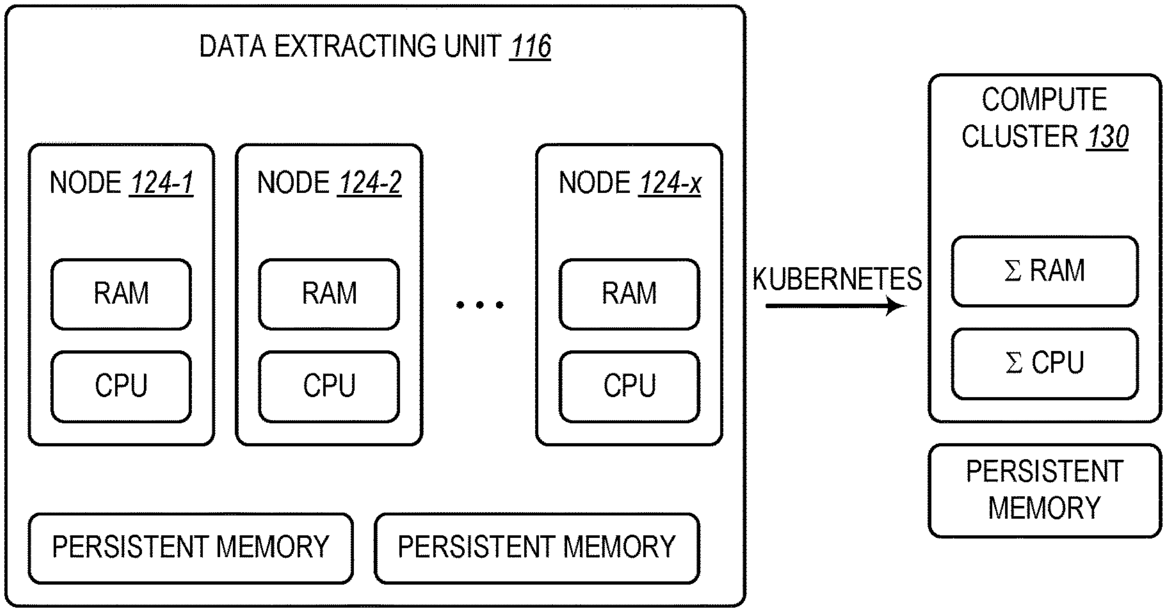
FIG. 10 is a block diagram illustrating a compute cluster of the data extracting unit of FIG. 9, according to various embodiments.

FIG. 10 is a block diagram illustrating an embodiment of a creation of a compute cluster 130 from the hardware of the Dataware device 116. In some embodiment, the Dataware device 116 may utilize a container orchestration system (e.g., Kubernetes) for automating the deployment, scaling, and management of the functionality (e.g., software) of the Dataware device 116. The nodes 124 or clusters of the Dataware device 116 may be connected with Kubernetes in some embodiments to create an effective compute cluster (e.g., compute cluster 130).

Figure 11:
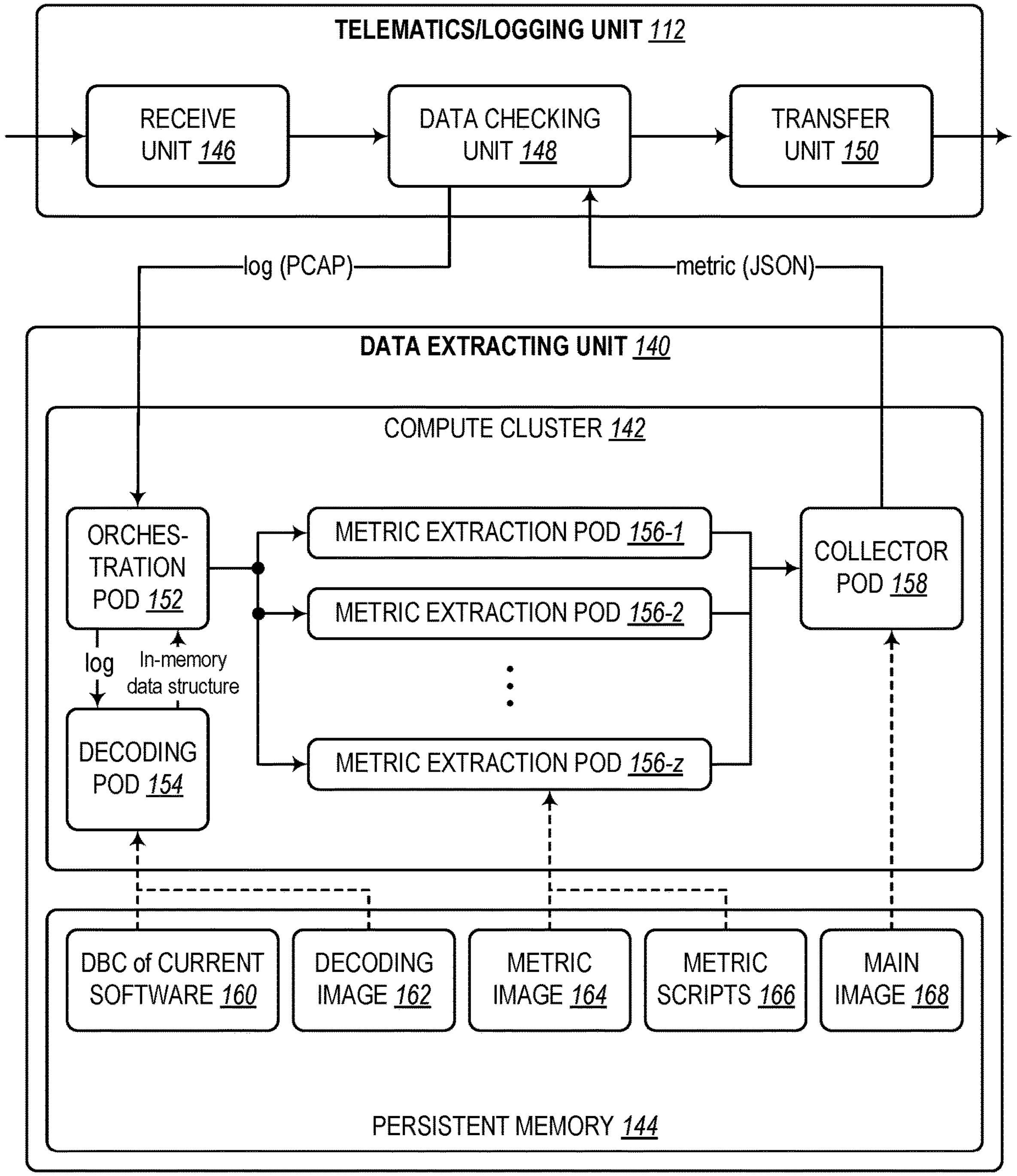
FIG. 11 is a block diagram illustrating a data extracting unit with respect to a telematics/logging unit of a vehicle telematics system, according to various embodiments of the present disclosure.

FIG. 11 is a block diagram illustrating another embodiment of a data extracting unit 140 (e.g., Dataware device) in connection with the telematics/logging unit 112 of the vehicle telematics system 110 of FIG. 8. In some respects, the data extracting unit 140 may be considered to be a referred implementation. The data extracting unit 140 includes a compute cluster 142 (e.g., compute cluster 130) and persistent memory 144 (e.g., persistent memory 126).

The telematics/logging unit 112 in this embodiment includes a receive unit 146 configured to receive real-time Ethernet data from the ECUs (e.g., ECUs 93*a*). The telematics/logging unit 112 may also include a data checking unit 148 that may be configured to check with the data extracting unit 140 to check if the data can be reduced or extracted. The data checking unit 148 passes the received data (e.g., PCAP logs or the like) via an Ethernet system to the data extracting unit 140 for data extraction. Then, the data extracting unit 140 extracts data, as appropriate, and supplied the extracted data back to the data checking unit 148. The returned data may include metrics in JSON format, or another similar format, via the Ethernet system. Furthermore, the telematics/logging unit 112 in this embodiment includes a transfer unit 150, configured to transfer the extracted metrics from the data extracting unit 140 to the cloud (e.g., cloud 18).

The compute cluster 142 of the data extracting unit 140 includes an orchestration pod 152, a decoding pod 154, a plurality of metric extraction pods 156-1, 156-2, . . . , 156-*z*, and a collector pod 158. The persistent memory 144 of the data extracting unit 140 may be configured to store a decoding (DBC) component 160, a decoding image component 162, a metric image component 164, a metric scripts component 166, and a main image component 168.

The persistent memory 144 may be configured to update the Dataware (e.g., data extracting unit 140) as needed. The persistent memory 144 is configured to store base or main images, DBC files of the current software release, calibration/parameter files, decoding and metric images, metric app scripts, and/or other data or software.

The data extracting unit 140 (or Dataware) may run a series of metric-extraction application using the metric extraction pods 156 on an individual log, within a memory device or database, in parallel with other vehicle operations. The applications of the metric extraction pods 156 may be run on a cluster after the logs have been generated on the vehicle.

The orchestration pod 152 sends time-series log data to the decoding pod 154, which is thereby configured to prepare a DataFrame (or similar in-memory timeseries data structure) of the logs and pass this structure back to the orchestration pod 152. The time-series log data (DataFrame) is then passed to each metric-extraction pod 156 in parallel. It will be readily apparent to those of ordinary skill in the art that, as used herein, DataFrame is illustrative only and other code-based data structures could be used equally. Each metric extraction pod 156 may be configured to run an independent pod (e.g., application) using, for example, a common, lightweight Python analysis image as a containerized app. Each metric extraction pod 156 exports data in a common schema to the collector pod 158, which sends the final data via Ethernet cables to the telematics/logging unit 112 for subsequent broadcasting to the cloud.

Figure 12A:
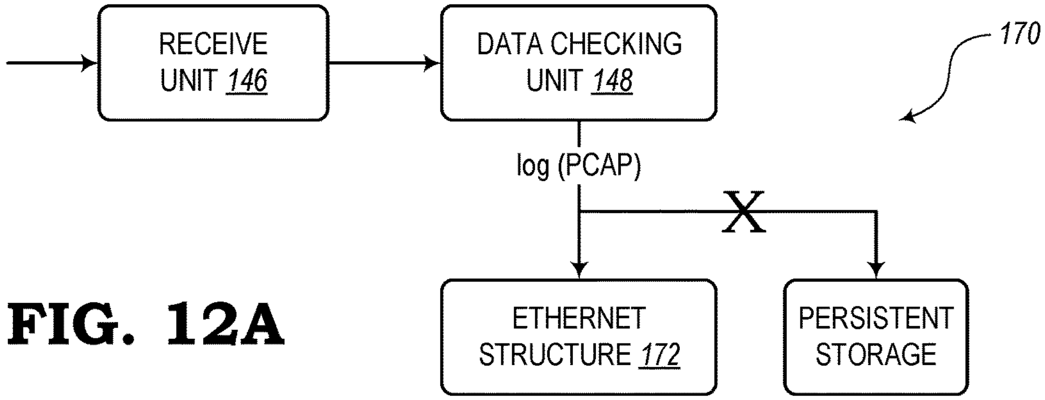
FIGS. 12A-12E are parts of the data extracting unit and telematics/logging unit shown in FIG. 11 to illustrate a procedure for extracting meaningful data in a vehicle telematics system, according to various embodiments.

According to some implementations, the data extracting unit 140 (e.g., Dataware) is configured to perform five main processes for extracting meaningful data in a vehicle telematics system. The five main processes may each be represented by the system shown in FIGS. 12A-12E. The five main processes may include:

I. Receiving Full-Fidelity Log Data
II. Preparing Data for Metric Apps
III. Running Metric Apps
IV. Exporting Data
V. Updating Dataware FIG. 12A is a block diagram showing an embodiment of a log generation system 170 that is the source of data for the first process of Receiving Full-Fidelity Log Data. The log generation system 170 includes the receive unit 146, the data checking unit 148, and Ethernet structure 172 for passing a PCAP log or the like from memory to the data extracting unit 140. Also shown is an indication that the PCAP log is not passed to an SSD or the like (e.g., SSD 38) since the logs are not written to the otherwise overworked or exhausted memory at this time.

Rather than writing the PCAP log to the SSD or the like, the telematics/logging unit 112 is configured to transmit the log (e.g., 10 minutes of full-fidelity log data) via the Ethernet structure or the like 172 to the data extracting unit 140 (e.g., Dataware). As a result of this, the full-fidelity log only ever exists in RAM and prevents continuous degradation of the SSD, for example.

Figure 12B:
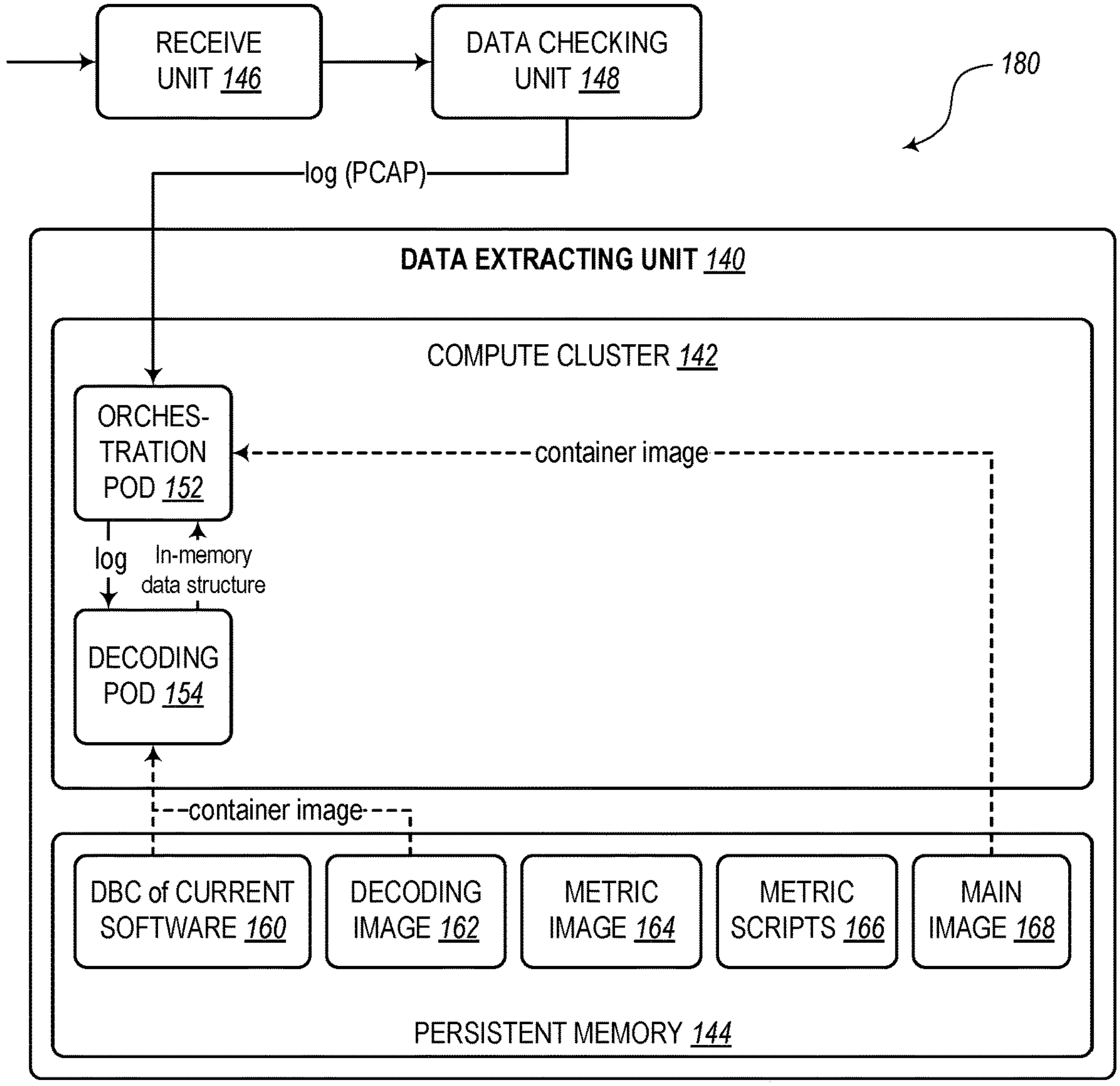

FIG. 12B is a block diagram showing an embodiment of a data preparation system 180 for performing the second process of Preparing Data for Metric Extraction. The data preparation system 180 includes the receive unit 146, the data checking unit 148, and relevant portions of the data extracting unit 140. Since each metric extraction pod 156 of the compute cluster 142 needs the time-series log data configured as an in-memory, decoded structure (DataFrame or the like), the orchestration pod 152 is configured to send all of the logs from the data checking unit 148 to the decoding pod 154. The orchestration pod 152 may get initialized with a main image from the main image component 168 in persistent memory 144.

The orchestration pod 152 receives the data via Ethernet and spawns the decoding pod 154. The decoding pod 154 uses the DBC file of the DBC component 160 and the decoding image of the decoding image component 162 to get time-series signal data. Then, the decoding pos 154 returns this information to the orchestration pod 152. By this point, the orchestration pod 152 has the time-series log in memory as a DataFrame or the like. In some embodiments, the decoding pod 154 may run in Go, so the exact output may not be a DataFrame, but may instead be easily converted to a DataFrame or similar format in the orchestration pod 152.

Figure 12C:
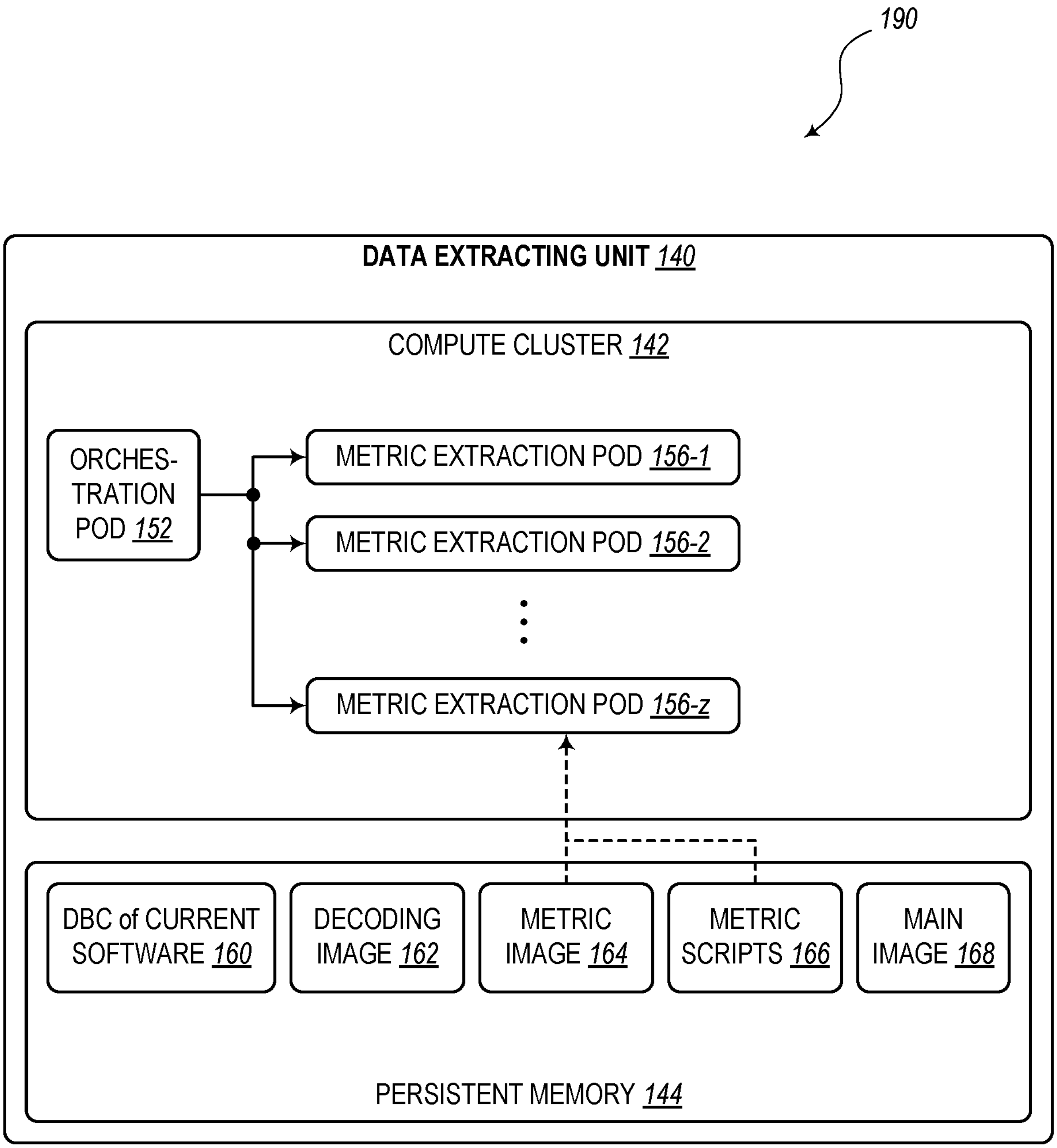

FIG. 12C is a block diagram showing an embodiment of a metric running system 190 for performing the third process of Running Metric Apps. The metric running system 190 may include the relevant portions of the data extracting unit 140. During this process, the decoding pod 154 (not shown in FIG. 12C) may be temporarily terminated in order to recover its memory and CPU, as needed. The orchestration pod 152 is configured to assess contextual information about the received logs to determine what states have occurred. Then, the orchestration pod 152 is configured to trigger respective metric analysis procedures based on the log's context. The metric extraction pods 156-1, 156-2, . . . , 156-*z* uses apps to share a common analysis base image, such as the metric image and metric scripts from the metric image component 164 and metric scripts component 166 of the persistent memory 144. In this sense, the metric scripts live outside of the image in persistent memory 144 and the metric extraction pods 156 are configured to run as parallel applications.

The data compute cluster 142 of the data extracting unit 140 is configured to run independently of the log generation processes and vehicle operation processes. As a result, the log generation process is fundamentally separate from the log processing process, and both can proceed in parallel. Furthermore, to reduce log processing time, the data may be processed in a suite of parallel pods (e.g., metric extraction pods 156) or other suitable applications with ample time to spare before the next log is received.

Figure 12D:
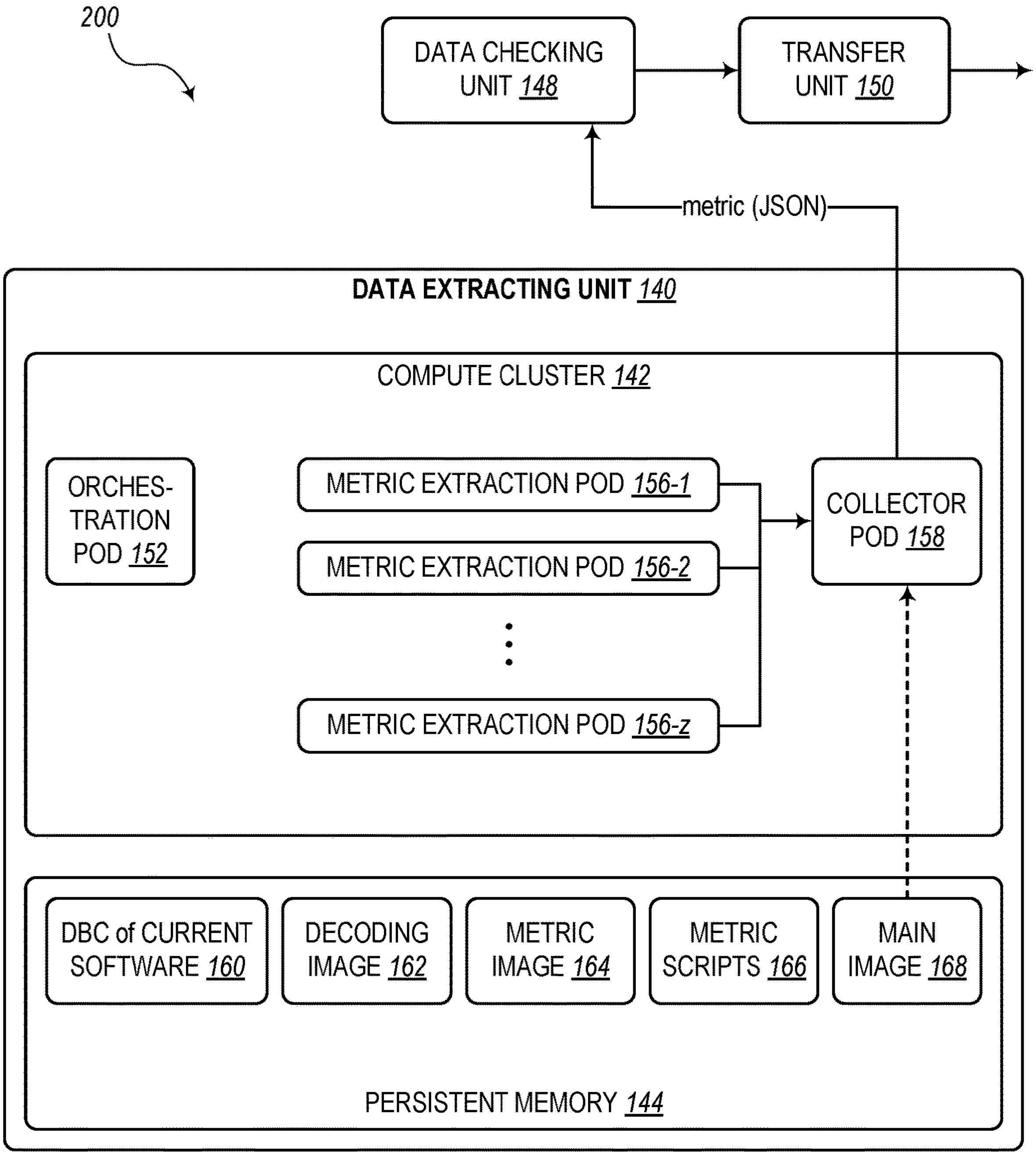

FIG. 12D is a block diagram showing an embodiment of a data exporting system 200 for performing the fourth process of Exporting Data. The data exporting system 200 may include the data checking unit 148 and the transfer unit 150 of the telematics/logging unit 112 in addition to the relevant portions of the data extracting unit 140. The metric extraction pods 156 may be configured to export data as a dictionary using a uniform schema, such as, for example:

```
{
  'app_id': <env variable>,
  'metrics':
  {
    '<metric name>':
    {
      'value': <numeric value, nullable>,
      'string': <string value, nullable>
    },
  }
}
```

The above Python dictionary is simply an example of an in-memory key-value data structure, of which various other data structures could be used in the present disclosure.

The collector pod 158 may be configured to receive these dictionaries and package them as "Dataware metrics" 202. Then, the collector pod 158 may send the Dataware metrics 202 via the Ethernet structure back to the data checking unit 148 of the telematics/logging unit 112. This extracted, highly-reduced data (i.e., Dataware metrics 202) is then transmitted to the cloud via the transfer unit 150.

Figure 12E:
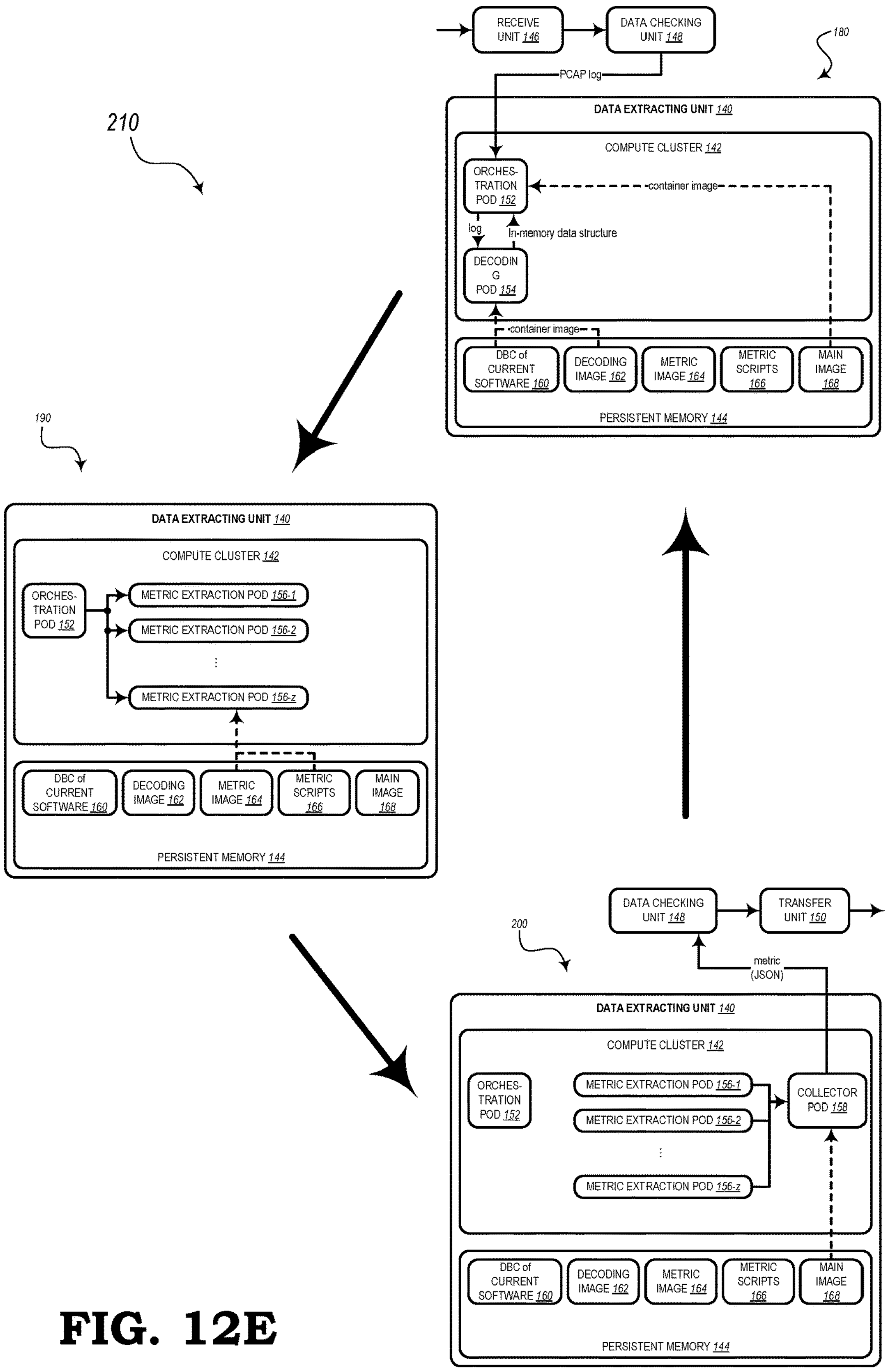

FIG. 12E is block diagram showing an embodiment of a repetition system 210 whereby the data preparation system 180 (Process II), the metric running system 190 (Process III), and the data exporting system 200 (Process IV) are performed in this specific sequence as needed to repeat the various procedures for each of the logs. When all logs are processed, the repetition system 210 may pause until additional logs are received from the telematics/logging unit 112.

Figure 13:
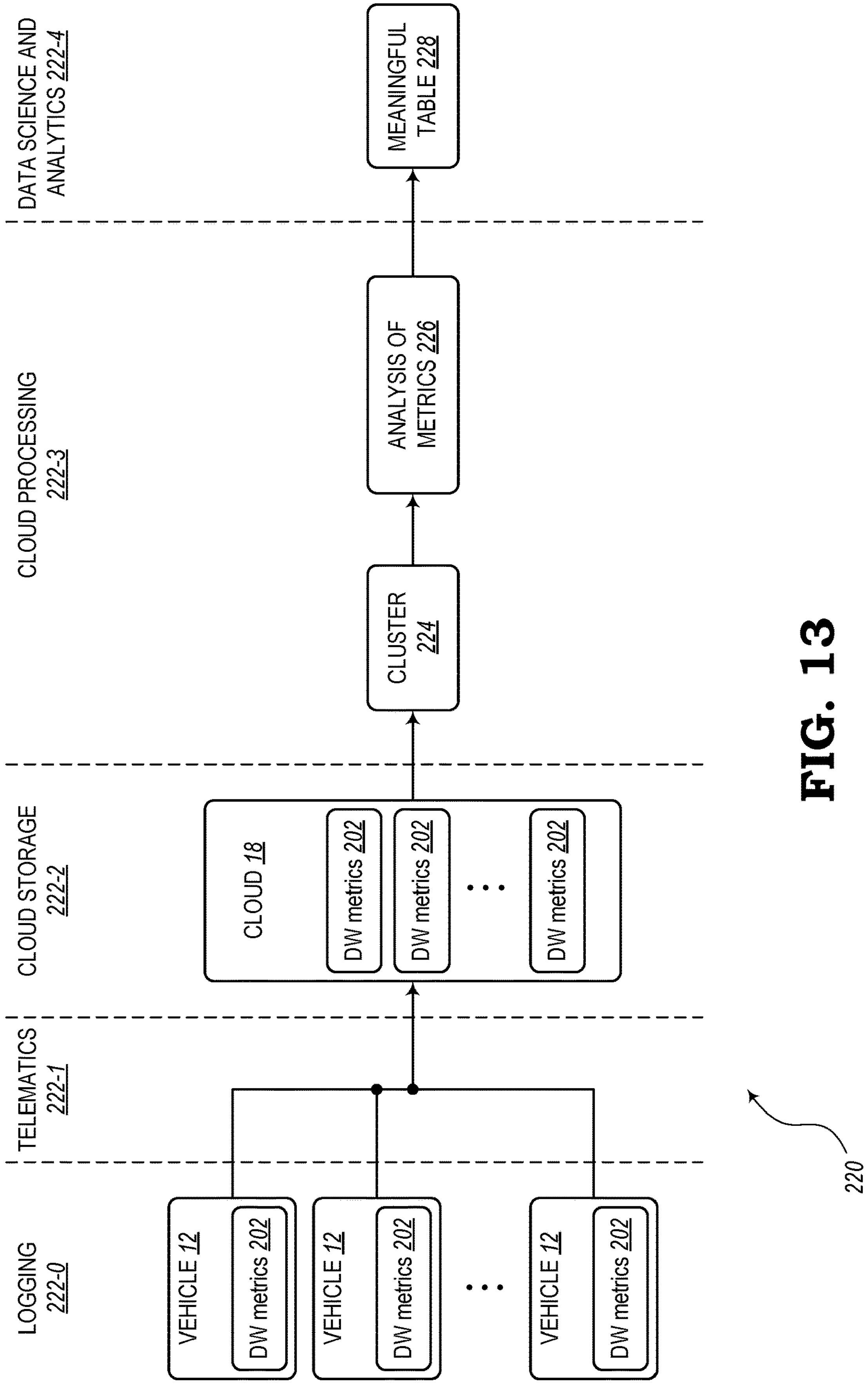
FIG. 13 is a block diagram illustrating operations of the vehicle monitoring system of FIG. 1 using the vehicle telematics system of FIG. 8 for each vehicle being monitored, according to various embodiments.

FIG. 13 is a function diagram 220 including operations of the vehicle monitoring system 10 of FIG. 1 using the vehicle telematics system 110 of FIG. 8 (according to a preferred embodiment) for each vehicle 12 being monitored. The operations of the functional diagram 220 includes a logging stage 222-0, a telematics stage 222-1, a cloud storage stage 222-2, a cloud processing state 222-3, and a data science and analytics stage 222-4.

In particular, each vehicle 12 performs data extraction to obtain the Dataware metrics 202, which is related to the logging stage 222-0 and results in the highly-reduced dataset of vehicle-related information described above. The telematics stage 222-1 is therefore simplified by having less data to transport, thereby making this stage much more affordable compared with the expensive telematics stage 64 of the functional diagram 60 of FIG. 5. Also, the cloud storage stage 222-2 includes storing the reduced dataset of the Dataware metrics 202 in the cloud, again saving costs. Also, the cloud processing stage 222-3 (cloud-computing) is simplified with less data to process. A cluster component 224 operates on the reduced dataset and an analysis unit 226 is configured to perform an analysis of the metrics (i.e., Dataware metrics 202). The results can be sent to a meaningful table 228 in the data science and analytics stage 222-4 for more simplified vehicle (and traffic) analytics procedures.

In summary, the present disclosure may be configured to significantly reduce (e.g., by about 100 times) the volume of data that is transmitted (to scale) for the telematics data strategy. This can be done in ways that are heretofore unavailable in conventional systems. The present disclosure provides embodiments that can save large amounts of money, not only in data transfer costs, but also in cloud processing (computing) costs. Even with data reduction, the meaningful data is not lost but can be preserved in a way where the useful information can allow the cloud-computing systems (e.g., server 16) to analyze the Dataware metrics 202 and perform analytics that would otherwise require all high-fidelity data in the cloud storage. Furthermore, beyond extracting metrics in-situ in the vehicle, models may be run on the high-fidelity data that are not available in conventional systems. In some embodiments, model may include ML model or other techniques or algorithms for learning through a training process, performing ML inference procedures, re-training as needed, etc., which too is unavailable in conventional logging systems. ML models are run in conventional systems as part of operation-critical control/operational devices, which presents risks for models that may encounter inputs that they have not been trained on (breaking the model and impairing critical functionality). The present disclosure enables the Dataware device to also run less-trained, less-validated models as pods in the log processing process since it is completely isolated from vehicle operation and functional safety dependencies.

As an example, the systems and methods of the present disclosure may be incorporated in one or more vehicles (or a fleet of vehicles), whether internal combustion engine (ICE) vehicles, hybrid vehicles (HEVs), or electric vehicles (EVs). In other embodiments, the present systems and methods may be incorporated in stationary storage devices, battery charging systems, etc., as well as in eVTOL, aviation, and hyperloop systems and the like—any systems that need high-fidelity-based metrics with functional-safety relevant ECUs for operation. The present solutions also enable other systems to learn from a complex product (e.g., a battery) at scale in a customer fleet in ways that are unavailable in conventional systems.

The present disclosure enables large scale data volume reduction by only sending extracted metrics over a cellular system (even while caching and using Wi-Fi). The present disclosure also enables high-fidelity data analysis at scale. Since data can be processed on the individual vehicles themselves, as described herein, at full fidelity, the systems can run all data science/analytics/ML apps as needed at scale on every vehicle without excessive costs on the cloud. Also, this results in a massive data processing cost reduction, since it can be very expensive for processing data logs in cloud-based services to process. Also, with the addition parallel processing features of the present disclosure, it is possible to extract just the relevant data in a timely manner.

The present disclosure describes systems and methods for extracting vehicle data and essentially moving some of the cloud-computing services from the cloud to the individual vehicles. In some embodiments, the present disclosure may include processes executed before transmission or storage of big data and reducing the volume of the data to include only the "important" or "useful" time-series datasets or metrics to thereby reduce the load on the cloud-computing servers.

Figure 14:
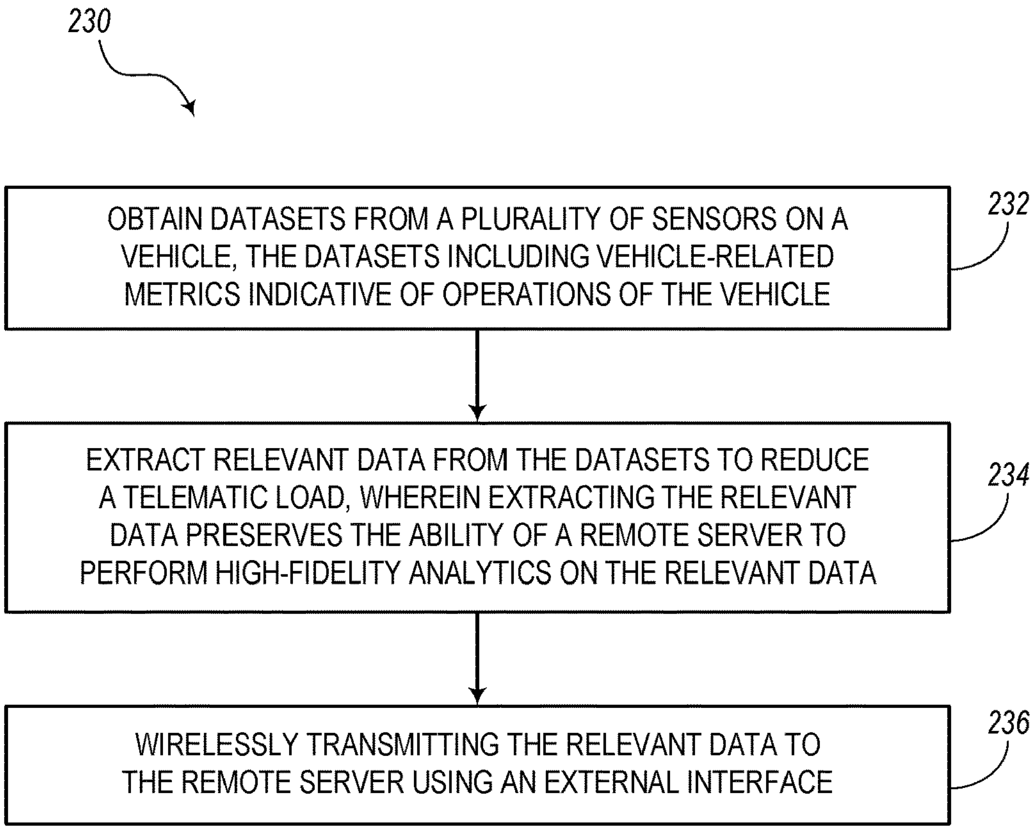
FIG. 14 is a flow diagram illustrating a process for extracting vehicle data, according to various embodiments.

FIG. 14 is a flow diagram illustrating an embodiment of a process 230 for extracting vehicle data. The process 230 may include the step of obtaining datasets from a plurality of sensors on a vehicle, as indicated in block 232, where the datasets may include vehicle-related metrics indicative of operations of the vehicle. The process 230 further includes extracting relevant data from the datasets to reduce a telematic load, as indicated in block 234. Also, the process 230 includes wirelessly transmitting the relevant data to a remote server using an external interface. In particular, the step of extracting the relevant data (block 234) may be configured to preserve the ability of the remote server to perform high-fidelity analytics on the relevant data.

The process 230 may further include the step of storing the relevant data in a Solid State Drive (SSD) or other persistent storage device subsequent to the step of extracting the relevant data from the datasets (block 234). Also, the step of extracting the relevant data (block 234) may include utilizing persistent memory and a plurality of nodes that are operationally separate from components used for performing motion functions in the vehicle, where each of the nodes may include Random Access Memory (RAM) and a Central Processing Unit (CPU).

In some embodiments, the step of extracting the relevant data (block 234) may include utilizing a) a plurality of metric extraction pods arranged in parallel, b) an orchestration pod, c) a decoding pod for obtaining a DataFrame or similar format from log data and forwarding data in the DataFrame or similar format to the plurality of metric extraction pods, d) a collector pod configured to receive useful metrics from the plurality of metric extraction pods, and/or e) persistent memory having one or more of a decoding (DBC) component, a decoding image component, a metric image component, a metric scripts component, and a main image component.

The process 230 may also include the step of causing the external interface to wirelessly transmit the relevant data to the remote server via a cellular system. The remote server may be a cloud-based server in communication with the cellular system. In some cases, the relevant data may further include Global Positioning System (GPS) data received from one or more GPS satellites.

According to some embodiments, the process 230 may include the step of sensing or detecting vehicle characteristics related to one or more of location, speed, direction, acceleration, battery usage, air-bag deployment, propulsion usage, accelerator usage, brake usage, vehicle dashboard alerts, etc., and/or obtaining information regarding traffic and road conditions or the like from one or more of nearby vehicles and roadway signaling equipment.

Figure 15:
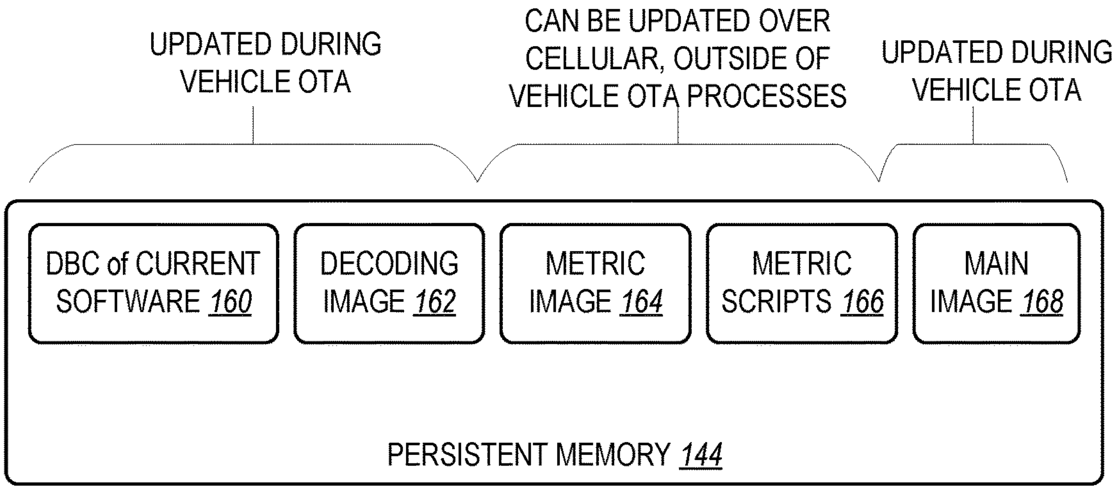
FIG. 15 is a schematic diagram highlighting the over-the-air (OTA) conditions under which different portions of the Dataware (data processing device) of the present disclosure may be updated.

FIG. 15 is a schematic diagram highlighting the over-the-air (OTA) conditions under which different portions of the Dataware of the present disclosure may be updated. In general, the DBC and decoding image may be updated during a vehicle-wide OTA. The metric image and metric scripts may be updated over cellular, for example, outside of the vehicle-wide OTA. The main image may be updated during a vehicle-wide OTA. This is relevant because, unlike an ECU solution, one can change code on the fly even while the vehicle is operating. This is enabled by the complete operational isolation of the Dataware device/system. It also enables corrections to the metric extraction scripts or an update related to which machine learning (ML) models are being tested at any time, not limited by when/how often an owner updates their vehicle. Thus, the DBC and image files for decoding/main functions could be updated during the vehicle-wide OTA process. Here, "image" refers to OS image, not a picture. It essentially includes the OS, any dependencies, built-in files/calibrations/settings, etc.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system incorporated in a vehicle, the system comprising:
- an electronic control unit;
- a sensor coupled to the electronic control unit;
- a data logging module operable for generating full-fidelity data and communicating with an external server via an external interface; and
- a data processing device coupled to the data logging module but isolated from the electronic control unit, the data processing device comprising:
  - a processing unit, and
  - a memory device configured to store instructions that, when executed, cause the processing unit to:
    - obtain data from the data logging module,
    - process the data to form a subset of the data, wherein the subset of the data represents a reduced data load as compared to the data, and
    - provide the subset of the data to the data logging module for communication to the external server via the external interface;
  - wherein the data processing device is functionally separated from the electronic control unit and operational and safety functions and networks of the vehicle, and
- wherein processing the data comprises utilizing a plurality of metric extraction pods arranged in parallel, and wherein processing the data further comprises utilizing an orchestration pod and a decoding pod for obtaining a predetermined format from log data and forwarding the log data in the predetermined format to the plurality of metric extraction pods.

2. The system of claim 1, wherein the subset of the data comprises one or more of a metric extracted from the data, a result of a test run on the data, and a selected portion of the data.

3. The system of claim 1, wherein the data processing device is further functionally separated from a data logger unit adapted to be coupled to the vehicle.

4. The system of claim 1, wherein the instructions further cause the processing unit to store the subset of the data in a persistent storage device subsequent to processing the data.

5. The system of claim 1, wherein processing the data comprises utilizing persistent memory and a plurality of nodes associated with the data processing device.

6. The system of claim 5, wherein each of the plurality of nodes comprises Random Access Memory (RAM) and a Central Processing Unit (CPU).

7. The system of claim 1, wherein processing the data further comprises utilizing a collector pod configured to receive a plurality of metrics from the plurality of metric extraction pods.

8. The system of claim 1, wherein processing the data further comprises utilizing persistent memory having one or more of a decoding component, a decoding image component, a metric image component, a metric scripts component, and a main image component.

9. The system of claim 1, wherein the external interface comprises one or more of a cellular interface, a wireless interface, and a near-field interface.

10. The system of claim 1, wherein the sensor is configured to detect a vehicle characteristic related to one or more of telematics, location, speed, direction, acceleration, braking, engine state, battery state, charging usage, air-bag deployment, accelerator usage, brake usage, equipment usage, equipment state, operational alert, safety alert, traffic condition, road condition, environmental condition, and occupant state.

11. A method for use in a vehicle, the method comprising:
- at a data processing device, obtaining data from a data logging module coupled to an electronic control unit and a sensor of the vehicle and operable for generating full-fidelity data;
- processing the data to form a subset of the data, wherein the subset of the data represents a reduced data load as compared to the data;
- providing the subset of the data to the data logging module of the vehicle for communication to an external server via an external interface of the vehicle;
- wherein the data processing device is functionally separated from the electronic control unit and operational and safety functions and networks of the vehicle;
- processing the data utilizing a plurality of metric extraction pods arranged in parallel; and
- processing the data utilizing an orchestration pod and a decoding pod for obtaining a predetermined format from log data and forwarding the log data in the predetermined format to the plurality of metric extraction pods.

12. The method of claim 11, wherein the subset of the data comprises one or more of a metric extracted from the data, a result of a test run on the data, and a selected portion of the data.

13. The method of claim 11, wherein the data processing device is further functionally separated from a data logger unit adapted to be coupled to the vehicle.

14. The method of claim 11, further comprising storing the subset of the data in a persistent storage device subsequent to processing the data.

15. The method of claim 11, further comprising processing the data utilizing persistent memory and a plurality of nodes associated with the data processing device.

16. The method of claim 15, wherein each of the plurality of nodes comprises Random Access Memory (RAM) and a Central Processing Unit (CPU).

17. The method of claim 11, further comprising processing the data utilizing a collector pod configured to receive a plurality of metrics from the plurality of metric extraction pods.

18. The method of claim 11, further comprising processing the data utilizing persistent memory having one or more of a decoding component, a decoding image component, a metric image component, a metric scripts component, and a main image component.

19. A non-transitory computer-readable medium comprising instructions stored in a memory and executed by a processing device to cause the processing device to carry out the steps comprising:

at a data processing device, obtaining data from a data logging module coupled to an electronic control unit and a sensor of the vehicle and operable for generating full-fidelity data;

processing the data to form a subset of the data, wherein the subset of the data comprises one or more of a metric extracted from the data, a result of a test run on the data, and a selected portion of the data, wherein the subset of the data represents a reduced data load as compared to the data; and providing the subset of the data to the data logging module of the vehicle for communication to an external server via an external interface of the vehicle;

wherein the data processing device is functionally separated from the electronic control unit and operational and safety functions and networks of the vehicle, wherein processing the data comprises utilizing a plurality of metric extraction pods arranged in parallel, and wherein processing the data further comprises utilizing an orchestration pod and a decoding pod for obtaining a predetermined format from log data and forwarding the log data in the predetermined format to the plurality of metric extraction pods.

20. The non-transitory computer-readable medium of claim 19, wherein the subset of the data comprises one or more of a metric extracted from the data, a result of a test run on the data, and a selected portion of the data.

21. The non-transitory computer-readable medium of claim 19, wherein the data processing device is functionally separated from the electronic control unit and the operational functions of the vehicle such that instructions for processing the data can be modified without affecting instructions associated with the operational functions of the vehicle.

* * * * *